US009168959B2

(12) United States Patent
Smith et al.

(10) Patent No.: US 9,168,959 B2
(45) Date of Patent: Oct. 27, 2015

(54) REAR-MOUNTED AERODYNAMIC STRUCTURE FOR TRUCK CARGO BODIES

(71) Applicant: Advanced Transit Dynamics, Inc., Hayward, CA (US)

(72) Inventors: Andrew F. Smith, Redwood City, CA (US); Charles M. Horrell, Solana Beach, CA (US); Jeffrey J. Grossmann, San Francisco, CA (US)

(73) Assignee: ADVANCED TRANSIT DYNAMICS, INC., San Francisco, CA (US)

( * ) Notice: Subject to any disclaimer, the term of this patent is extended or adjusted under 35 U.S.C. 154(b) by 0 days.

(21) Appl. No.: 14/231,593

(22) Filed: Mar. 31, 2014

(65) Prior Publication Data

US 2014/0292024 A1      Oct. 2, 2014

Related U.S. Application Data

(63) Continuation of application No. 13/752,374, filed on Jan. 28, 2013, now Pat. No. 8,708,399, which is a continuation of application No. 12/903,770, filed on Oct. 13, 2010, now Pat. No. 8,360,509, which is a (Continued)

(51) Int. Cl.
*B62D 35/00* (2006.01)
*B62D 63/08* (2006.01)

(52) U.S. Cl.
CPC .............. *B62D 35/001* (2013.01); *B62D 63/08* (2013.01); *B62D 35/004* (2013.01)

(58) Field of Classification Search
CPC .......................... B62D 35/001; B62D 35/007
USPC ................................ 296/180.4, 180.5, 181.5
See application file for complete search history.

(56) References Cited

U.S. PATENT DOCUMENTS

| 2,737,411 A | 3/1956 | Potter |
| 3,971,586 A | 7/1976 | Saunders |

(Continued)

FOREIGN PATENT DOCUMENTS

DE            19524825 A1      1/1997

*Primary Examiner* — Jason S Morrow
(74) *Attorney, Agent, or Firm* — Perkins Coie LLP

(57) ABSTRACT

This invention provides a foldable/retractable and unfoldable/deployable, rearwardly tapered aerodynamic assembly for use on the rear trailer bodies and other vehicles that accommodate dual swing-out doors. The aerodynamic assembly includes a right half mounted on the right hand door and a left half mounted on a left hand door. Each half is constructed with a side panel, top panel and bottom panel, which each form half of an overall tapered box when deployed on the rear of the vehicle, the bottom panels and top panels being sealed together at a pair of overlapping weather seals along the centerline. The panels are relatively thin, but durable, and are joined to each other by resilient strip hinges. The top and bottom panels are also hinged to form two sections along diagonal lines to facilitate folding of all panels in a relatively low-profile stacked orientation. This low profile allows the doors to be swung through approximately 270 degrees to be secured to the sides of the body in a manner that does not interfere with adjacent doors or bodies in, for example a multi-bay loading dock. A swing arm assembly and gas spring biases the panels into a deployed position that can be refolded by grasping the side panel and rotating it inward toward the door surface. The top and bottom panels are partly inwardly folded when deployed to define external valleys using a stop assembly. This ensures that the panels fold readily when desired without the two sections of the panels "locking up".

19 Claims, 15 Drawing Sheets

Related U.S. Application Data continuation-in-part of application No. 12/122,645, filed on May 16, 2008, now Pat. No. 8,100,461.

(60) Provisional application No. 61/039,411, filed on Mar. 25, 2008, provisional application No. 60/938,697, filed on May 17, 2007.

(56) References Cited

U.S. PATENT DOCUMENTS

| | | |
|---|---|---|
| 4,210,354 A | 7/1980 | Canning |
| 4,236,745 A | 12/1980 | Davis |
| 4,257,641 A | 3/1981 | Keedy |
| 4,433,865 A | 2/1984 | Crompton |
| 4,451,074 A | 5/1984 | Scanlon |
| 4,458,936 A | 7/1984 | Mulholland |
| 4,508,380 A | 4/1985 | Sankrithi |
| 4,601,508 A | 7/1986 | Kerian |
| 4,682,808 A | 7/1987 | Bilanin |
| 4,688,841 A | 8/1987 | Moore |
| 4,702,509 A | 10/1987 | Elliot |
| 4,741,569 A | 5/1988 | Sutphen |
| 4,818,015 A | 4/1989 | Scanlon |
| 4,978,162 A | 12/1990 | Labbe |
| 5,058,945 A | 10/1991 | Elliot et al. |
| 5,236,347 A | 8/1993 | Andrus |
| 5,240,306 A | 8/1993 | Flemming |
| 5,280,990 A | 1/1994 | Rinard |
| 5,348,366 A | 9/1994 | Baker et al. |
| 5,375,903 A | 12/1994 | Lechner |
| 5,498,059 A | 3/1996 | Switlik |
| 5,823,610 A | 10/1998 | Ryan et al. |
| 5,842,734 A | 12/1998 | Lechner |
| 5,947,548 A | 9/1999 | Carper et al. |
| 6,092,861 A | 7/2000 | Whelan |
| 6,257,654 B1 | 7/2001 | Boivin et al. |
| 6,286,892 B1 | 9/2001 | Baur et al. |
| 6,286,894 B1 | 9/2001 | Kingham |
| 6,309,010 B1 | 10/2001 | Whitten |
| 6,409,252 B1 | 6/2002 | Andrus |
| 6,457,766 B1 | 10/2002 | Telnack |
| 6,467,833 B1 | 10/2002 | Travers |
| 6,485,087 B1 | 11/2002 | Roberge et al. |
| 6,561,575 B2 | 5/2003 | Fairburn et al. |
| 6,616,218 B2 | 9/2003 | Bauer et al. |
| 6,666,498 B1 | 12/2003 | Whitten |
| 6,779,834 B1 | 8/2004 | Keller |
| 6,789,839 B1 | 9/2004 | Samuelson |
| 6,799,791 B2 | 10/2004 | Reiman et al. |
| 6,854,788 B1 | 2/2005 | Graham |
| 6,877,793 B2 | 4/2005 | Cory |
| 6,959,958 B2 | 11/2005 | Basford |
| 7,008,004 B2 | 3/2006 | Ortega et al. |
| 7,008,005 B1 | 3/2006 | Graham |
| 7,404,592 B2 | 7/2008 | Reiman et al. |
| 2004/0119319 A1 | 6/2004 | Reiman et al. |
| 2007/0001481 A1 | 1/2007 | Breidenbach |
| 2007/0126261 A1 | 6/2007 | Breidenbach |
| 2008/0048468 A1 | 2/2008 | Holubar |
| 2008/0309122 A1 | 12/2008 | Smith et al. |
| 2009/0179456 A1 | 7/2009 | Holubar |
| 2009/0200834 A1 | 8/2009 | Vogel et al. |

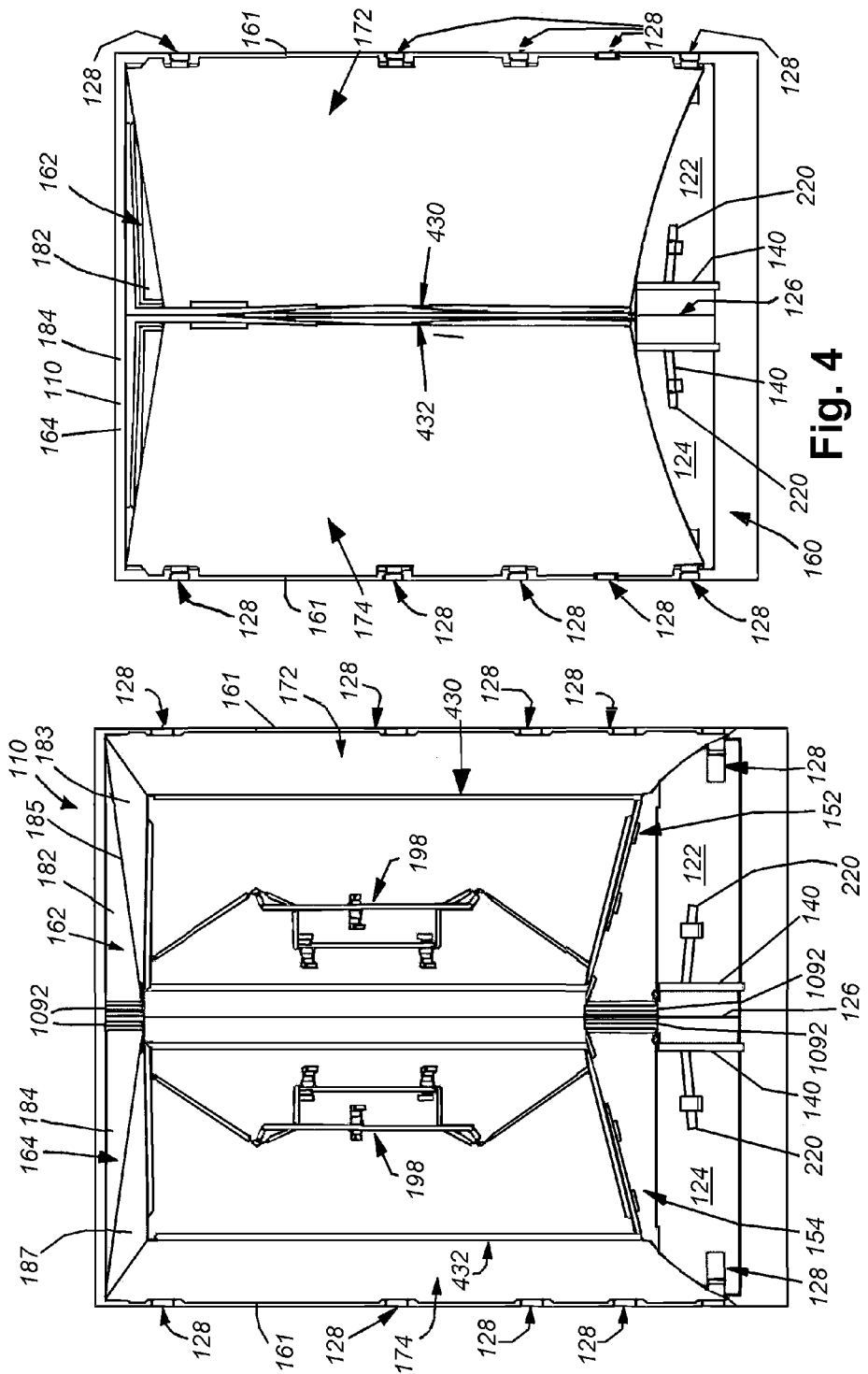

REAR-MOUNTED AERODYNAMIC STRUCTURE FOR TRUCK CARGO BODIES

RELATED APPLICATIONS

This application is a continuation of U.S. patent application Ser. No. 13/752,374, filed Jan. 28, 2013, now U.S. Pat. No. 8,708,399, entitled REAR-MOUNTED AERODYNAMIC STRUCTURE FOR TRUCK CARGO BODIES, the entire disclosure of which is herein incorporated by reference, which is a continuation of U.S. patent application Ser. No. 12/903,770, filed Oct. 13, 2010, now U.S. Pat. No. 8,360,509, entitled REAR-MOUNTED AERODYNAMIC STRUCTURE FOR TRUCK CARGO BODIES, the entire disclosure of which is herein incorporated by reference; which is a continuation-in-part of U.S. patent application Ser. No. 12/122,645, filed May 16, 2008, now U.S. Pat. No. 8,100,461, entitled REAR-MOUNTED AERODYNAMIC STRUCTURE FOR TRUCK CARGO BODIES, the entire disclosure of which is also herein incorporated by reference; which claims the benefit of U.S. Provisional Application Ser. No. 61/039,411, filed Mar. 25, 2008, entitled REAR-MOUNTED AERODYNAMIC STRUCTURE FOR TRUCK CARGO BODIES, the entire disclosure of which is also herein incorporated by reference; and which also claims the benefit of U.S. Provisional Application Ser. No. 60/938,697, filed May 17, 2007, entitled REAR-MOUNTED AERODYNAMIC STRUCTURE FOR TRUCK CARGO BODIES, the entire disclosure of which is also herein incorporated by reference.

FIELD OF THE INVENTION

This invention relates to aerodynamic structures mounted on the rear end of truck bodies, and more particularly to deployable and retractable aerodynamic structures for use on truck bodies having rear doors.

BACKGROUND OF THE INVENTION

Trucking is the primary mode of long-distance and short-haul transport for goods and materials in the United States, and many other countries. Trucks typically include a motorized cab in which the driver sits and operates the vehicle. The cab is attached to a box-like cargo section. Smaller trucks typically include an integral cargo section that sits on a unified frame which extends from the front wheels to the rear wheel assembly. Larger trucks often include a detachable cab unit, with multiple driven axles, and a separate trailer with a long box-like cargo unit seated atop two or more sets of wheel assemblies. These truck assemblages are commonly referred to as "semi-trailers" or "tractor trailers." Most modern trucks' cabs, particularly those of tractor trailers, have been fitted with aerodynamic fairings on their roof, sides and front. These fairings assist in directing air over the exposed top of the box-like cargo body, which typically extends higher (by several feet) than the average cab roof. The flat, projecting front face of a cargo body is a substantial source of drag, above the cab roof. The use of such front-mounted aerodynamic fairings in recent years has served to significantly lower drag and, therefore, raise fuel economy for trucks, especially those traveling at high speed on open highways.

However, the rear end of the truck's cargo body has remained the relatively unmodified throughout the history of tractor trailers. This is mainly because most truck bodies in the U.S., and various other countries, include large swinging or rolling doors on their rear face. Trucks may also include a lift gate or a lip that is suited particularly to backing the truck into a loading dock area so that goods can be unloaded from the cargo body. It is well-known that the provision of appropriate aerodynamic fairings (typically consisting of an inwardly tapered set of walls) would further reduce the aerodynamic profile of the truck by reducing drag at the rear face. The reduction of drag, in turn, increases fuel economy.

Nevertheless, most attempts to provide aerodynamic structures that integrate with the structure and function of the rear cargo doors of a truck body have been unsuccessful and/or impractical to use and operate. Such rear aerodynamic structures are typically large and difficult to remove from the rear so as to access the cargo doors when needed. One approach is to provide a structure that swings upwardly, completely out of the path of the doors. However, aerodynamic structures that swing upwardly require substantial strength or force to be moved away from the doors, and also require substantial height clearance above an already tall cargo body. Other solutions have attempted to provide an aerodynamic structure that hinges to one side of the cargo body. While this requires less force to move, it also requires substantial side clearance—which is generally absent from a closely packed, multi-truck loading dock.

In fact, most loading dock arrangements require that the relatively thin cargo doors of conventional trucks swing open fully to about 270 degrees so that they can be latched relatively flush against the adjacent sides of the cargo body. Only in this manner can the truck be backed into a standard-side-clearance loading dock, which is often populated by a line of closely-spaced trailers that are frequently entering and leaving the dock. In such an environment, side-projecting or top-projecting aerodynamic fairings would invariably interfere with operations at the loading dock.

One possible approach is to bifurcate the aerodynamic structure into a left hinged and a right-hinged unit that defines a complete unit when closed, and hinges open to reveal the doors. However, the two separate sections still present a large projection that would be incapable of swinging the requisite 270 degrees, and would undesirably tend to project into the adjacent loading bays when opened.

Another alternative is to remove the fairing structure from the truck before it is parked at the loading bay. However, the removed structure must then be placed somewhere during the loading/unloading process. Because most truck doors are relatively large, being in the range of approximately 7-8 feet by 8-9 feet overall, removing, manipulating and storing a fairing in this manner may be impractical, or impossible, for the driver and loading dock staff.

Many other approached to providing an aerodynamic structure to the rear of a truck trailer body have been proposed. However most lack practicality and/or workability, and would either fail to perform as expected or pose too great an inconvenience to the operator. Nevertheless the need for such an aerodynamic structure is clear.

In the face of ever-increasing fuel costs, it is critical to develop aerodynamic structures that can be applied to the rear of a truck cargo body, either as an original fitment, or by retrofit to existing vehicles. These structures should exhibit durability and long service life, be easy to use by the average operator, not interfere with normal loading and unloading operations through a rear cargo door, and not add substantial additional cost or weight to the vehicle. The structure should exhibit a low profile on the vehicle frame and/or doors, not impede side clearance when the doors are opened, and where possible, allow for clearance with respect to conventional door latching mechanisms. Such structures should also allow for the display of legally required lighting on the rear, as well as other legally required locations. Moreover, given the large existing fleet of trucks and trailers, it is highly desirable that an aerodynamic structure be easily and inexpensively retrofittable to a wide range of existing vehicles without undue customization.

SUMMARY OF THE INVENTION

This invention overcomes disadvantages of the prior art by providing foldable/retractable and unfoldable/deployable, rearwardly tapered aerodynamic assembly for use on the rear trailer bodies and other vehicles that accommodate dual swing-out doors. The aerodynamic assembly includes a right half mounted on the right hand door and a left half mounted on a left hand door. Each half is constructed with a side panel, top panel and bottom panel, which form half of an overall tapered box when deployed on the rear of the vehicle, the bottom panels and top panels being sealed together at a pair of overlapping weather seals along the centerline. The panels are relatively thin, but durable, and are joined to each other by resilient strip hinges. The top and bottom panels are also hinged to form two sections along diagonal lines to facilitate folding of all panels in a relatively low-profile stacked orientation. This low profile allows the doors to be swung through approximately 270 degrees to be secured to the sides of the body in a manner that does not interfere with adjacent doors or bodies in, for example a multi-bay loading dock. A swing arm assembly and gas spring biases the panels into a deployed position that can be refolded by grasping the side panel and rotating it inward toward the door surface. The top and bottom panels are partly inwardly folded when deployed to define external valleys using a stop assembly. This ensures that the panels fold readily when desired without the two sections of the panels "locking up" due to an overly planar profile.

While the panels herein include weather seals to enhance aerodynamic efficiency, it is contemplated, in alternate embodiments that panels can confront each other with small gaps, free of an engaging seals. Alternatively the seals can be lightly engaging or provide small gaps therebetween that may become more closely engaging at high speeds (under increased airflow).

In an illustrative embodiment, the aerodynamic assembly provides a structure that moves between a folded orientation and an unfolded orientation for the rear of a vehicle body having a right hand door and a left hand door. A right aerodynamic assembly half is provided, with a right top panel including a top door-hinged section hingedly attached adjacent a top of the right hand door to fold downwardly, a right bottom panel including a bottom door-hinged section hingedly attached adjacent a bottom of the right hand door to fold upwardly and a right side panel hingedly attached adjacent an outboard edge of the right hand door to fold inwardly toward a center line between the right hand door and the left hand door, the top panel further including a top side panel-hinged section hingedly attached to each of the top door hinged section and a top region of the side panel and the bottom panel further including a bottom side panel-hinged section hingedly attached to each of the bottom door hinged section and a bottom region of the side panel. A left aerodynamic assembly half is also provided, with a left top panel including a top door-hinged section hingedly attached adjacent a top of the left hand door to fold downwardly, a left bottom panel including a bottom door-hinged section hingedly attached adjacent a bottom of the left hand door to fold upwardly and a side panel hingedly attached adjacent an outboard edge of the left hand door to fold inwardly toward a center line between the right and door and the left hand door, the top panel further including a top side panel-hinged section hingedly attached to each of the top door hinged section and a top region of the side panel and the bottom panel further including a bottom side panel-hinged section hingedly attached to each of the bottom door hinged section and a bottom region of the side panel. A right swing arm assembly is hingedly attached to the right hand door, and through a respective tie rod, to each of the right top panel and the right bottom panel. A left swing arm assembly is also hingedly attached to the left hand door, and through a respective tie rod, to each of the left top panel and the left bottom panel In an illustrative embodiment, a spring assembly is operatively connected at a first end to at least one of the right hand door and the left hand door, and is constructed and arranged to respectively bias at least one of the right aerodynamic assembly half and the left aerodynamic assembly half into the unfolded orientation. This spring can include a damper and can illustratively comprise a gas spring that is mounted between a bracket on each door and a vertical member at the far end of each swing arm. In this manner the swing arm provides a coordinated bias force to the top and bottom panels, which, in turn bias the interconnected side panel into the unfolded orientation. Moreover, the top and bottom panels can be mounted on hinges to their respective door using hinges that define an angled hinge axis. In this manner the door-facing edges of top and bottom panels remain horizontal across the width when deployed, but define a gap that tapers inwardly when folded so as to provide clearance for the door lock rods and other components, such as the swing arm assemblies. In an embodiment, the panels are hinged together using strips of a resilient material that is fastened at each side of the junction to the associated panel. These hinges allow for breakage in the event of an impact, and also allow for modest misalignment when folded, thereby facilitating the stacking of the panels when folded. The side panels can include a latch component, such as a pin along their rear interior face. This selectively engages a second latch component on the exterior face of the bottom panel, near the door and centerline. In general, the bottom panels can be located at a position on the door above door lock rod handles for ease of access to the locking system when the panels are folded. Moreover, the bottom panels can be formed as an open framework, with hinge positions and other connection bases provided within the framework, similarly to those in a solid panel. An open framework reduces the chances of accretion of debris and snow in certain climates. The panels can also be mounted on dual-swinging doors or frameworks that selectively latch to the vehicle rear, and that swing outwardly to reveal an inner door of a non-dual-swinging, such as a roll up doors. The overlying doors or frameworks operate to swing approximately 270 degrees in the same manner as regular dual-swinging doors.

In another embodiment the aerodynamic assembly for the rear end of a vehicle body provides a four-sided arrangement of panels that taper in a rearward direction from a rear of the vehicle body, and being hingedly attached to at least one of a door assembly and a framework assembly that is hingedly attached to the vehicle body, the four-sided arrangement of panels including (a) a right hand top panel, a right hand side panel and a right hand bottom panel, hingedly joined so as to selectively unfold into a right hand folded orientation and unfold into a right hand deployed orientation and (b) a left hand top panel, a left hand side panel, left hand bottom panel hingedly joined so as to selectively unfold into a left hand folded orientation and unfold into a left hand deployed orientation. A right hand interconnection, that can comprise a swing arm assembly and a spring assembly, is provided between the right hand top panel and the right hand bottom panel constructed and arranged to cause the right hand top panel, the right hand side panel and the right hand bottom panel to self-collapse when the at least one door assembly and framework assembly is opened and rotated into engagement with a side of the vehicle body. Likewise, a left hand interconnection, that can also comprise a swing arm assembly and a spring assembly, is provided between the left hand top panel and the left hand bottom panel constructed and arranged to cause the left hand top panel, the left hand side panel and the left hand bottom panel to self-collapse when the at least one door assembly and framework assembly is opened and rotated into engagement with a side of the vehicle body.

BRIEF DESCRIPTION OF THE DRAWINGS

The invention description below refers to the accompanying drawings, of which:

FIG. 3 is a rear view of the truck trailer body of FIG. 1 showing the aerodynamic assembly in the deployed orientation;

FIG. 4 is a rear view of the truck trailer body of FIG. 1 showing the aerodynamic assembly in the retracted orientation;

DETAILED DESCRIPTION

Figure 1:
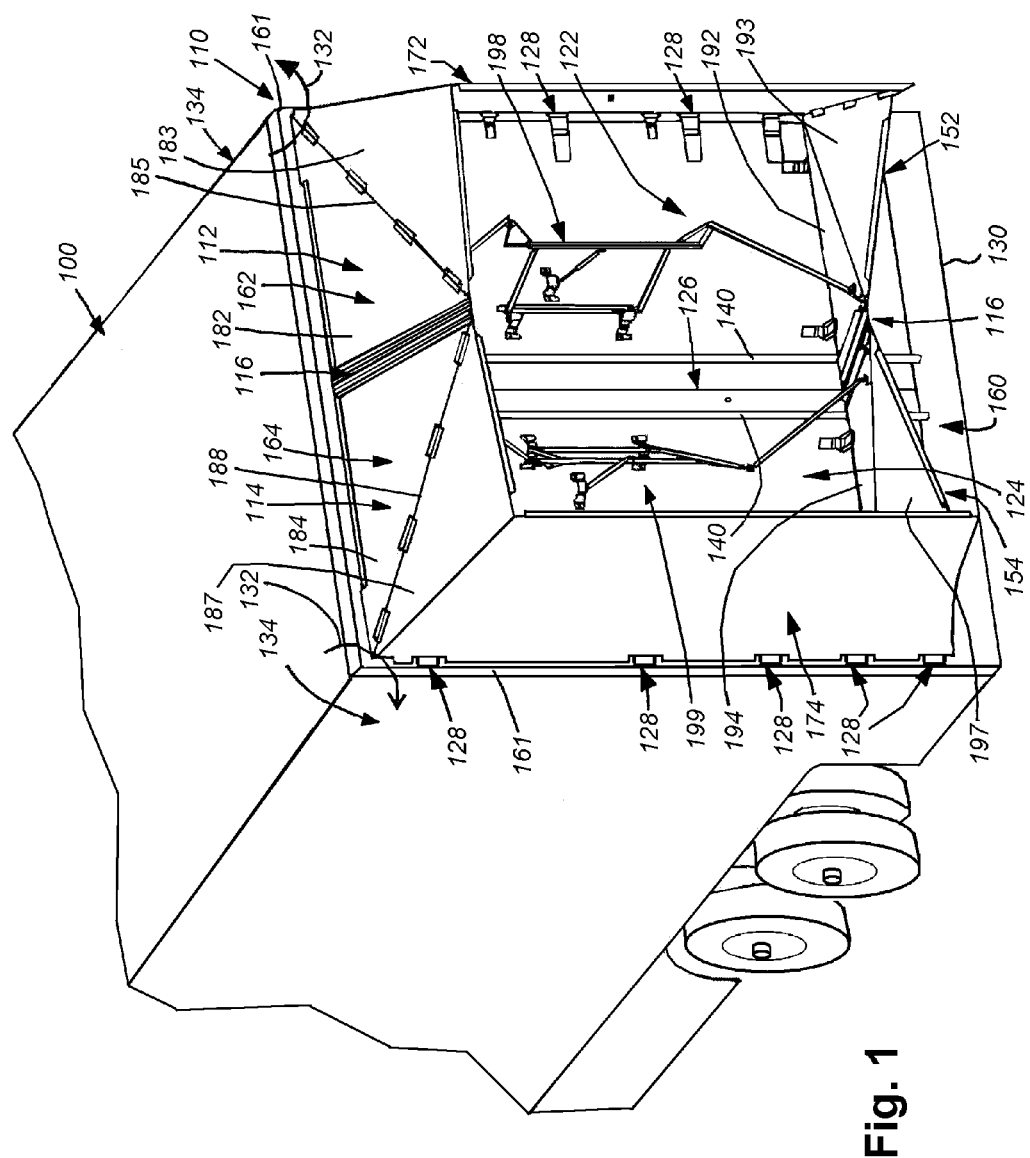
FIG. 1 is a partial perspective view of the rear end of a truck trailer body including a rear-mounted aerodynamic assembly in an unfolded/deployed orientation according to an illustrative embodiment.

FIG. 1 details the rear end of a conventional tractor trailer body 100, which has been provided with aerodynamic assembly 110 along its rear end. The assembly operates to reduce drag as a truck and trailer move at high speed down a roadway. For background, the operation of an aerodynamic assembly having a panel arrangement similar to that shown herein is described in the above-incorporated U.S. patent application Ser. No. 12/122,645, published as U.S. Published Application No. 2008/0309122 A1, filed May 16, 2008, entitled REAR-MOUNTED AERODYNAMIC STRUCTURE FOR TRUCK CARGO BODIES, the teachings of which are expressly incorporated herein by reference as further background information. The aerodynamic assembly 100 is arranged in two halves. A right half 112 is mounted with respect to a right-hinged door 122, and a left half 114 is mounted with respect to a left-hinged door 124. A joint 116 between the halves 112 and 114 is provided. This joint is aligned with the joint 126 between the two doors 122 and 124. For the below, the joint 116 is comprised of closely engaging, overlapping seals manufactured from a suitable elastomer. As shown, each door includes a plurality of conventional hinges 128 that are placed at appropriate locations with respect to the rear frame 130 of the trailer body. The rear frame 130 is constructed as a rectangular framework consisting of box or channel members. It is further constructed from a sturdy metal, such as steel. The doors are adapted to swing outwardly, as shown by the curved arrows 132. This outward swing is approximately 270 degrees, so that the doors normally attach (using an appropriate hook-up or other hold-down assembly) against the adjacent sides 134 of the trailer body. In this manner, and as described above, the doors 122, 124 exhibit a low-profile against the sides of the trailer body when fully opened. This allows the trailer to be parked side-by-side with other trailers in a loading dock free of interference. In other words, when the doors are fully folded against the sides of the trailer body, they do not obstruct or interfere with the doors of adjacent side-by-side trailers in the dock (which may be closely adjacent to each other).

In order to facilitate the use of an aerodynamic structure on the rear of a trailer body, while still allowing doors to be accessible, and to open fully, each aerodynamic assembly half 112 and 114 should fold flushly against the door, providing a low profile that, when the doors are opened approximately 270 degrees, does not interfere with the side of the trailer body. If the folded aerodynamic assemblies exhibit too high of a profile, then the hinge edges of the doors will bind against the sides of the trailer body as they are opened, and will not be able to lie flushly against the trailer body sides. The above-incorporated, published U.S. Patent Application includes certain embodiments that provide modified door hinges. However, this requires substantial modification to the trailer and does not universally address various door configurations. Thus, the illustrative embodiment provides an aerodynamic assembly that effectively channels air to reduce drag at the rear of the trailer body, while also allowing the aerodynamic assemblies to be folded flushly against the doors when not in use, so that they are free of interference with respect to the door sides when the doors are fully opened and reside against the trailer sides.

Figure 2:
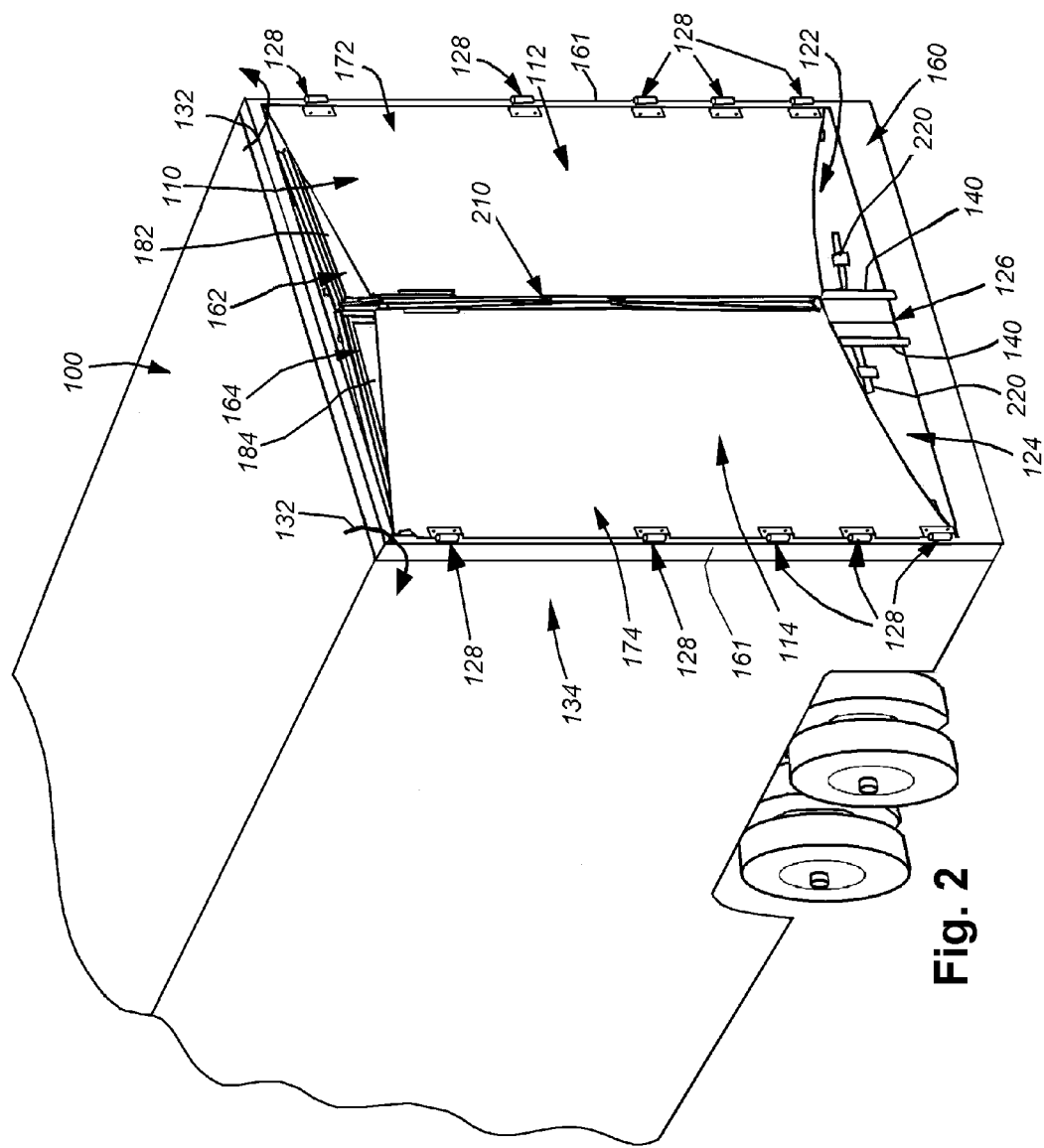
FIG. 2 is a partial perspective view of the rear end of FIG. 1 showing the aerodynamic assembly in a folded/retracted orientation.

The folded orientation is shown further in FIG. 2. Note that each half 112 and 114 folds flushly against its respective door in a low-profile manner. In an embodiment, this profile is no more than approximately 1 inch outward from the door surface at the side of the trailer body and no more than approximately 4 inches outward from the door surface at the centerline of the body between the right hand and left hand doors. A gap 210 is aligned relative to the door seam 126 so that, when the doors 122 and 124 are swung open, the folded panel assemblies 112 and 114 residing on each door do not interfere with each other. As described further below, each door includes a lock rod 140 that is rotated by a respective handle 220 into and out of a locked orientation. The aerodynamic assembly is oriented at its bottom end so as to allow access to the lock rod handle 220 and other associated locking mechanisms. This geometry still sufficiently to provide desired improvement of the body's aerodynamics, notwithstanding that the bottom panels 152 and 154 are elevated above the bottom edge 130 of the frame 160 by approximately 1 to 1½ feet. In alternate embodiments, the bottom panels 152 and 154 can be located lower on the frame, with appropriate accommodations made for the actuation of the lock rods 140 and other components, such as tail lights.

With further reference to FIGS. 3 and 4, the arrangement of panel members in the overall aerodynamic assembly 110 are shown in further detail. In addition to the bottom panels 152 and 154, each aerodynamic assembly half 112 and 114 includes a top panel 162 and 164, respectively. There are also provided respective right-hand and left-hand side panels 172 and 174 that extend approximately the full height of each door 122 and 124 along the respective side edges 161 of the frame 160. The illustrative dimensions and angles of the panels are described in further detail below. Generally, the top panels 162 and 164 and bottom panels 152 and 154 each consist of a pair of panel sections. More particularly, the right upper panel 112 consists of a door-hinged panel section 182 and a side panel-hinged panel section 183. These are joined at a diagonal hinge line 185. Likewise, the left upper panel 164 consists of door-hinged panel section 184, a side panel-hinged panel section 187 and a diagonal hinge line 189 therebetween. Similarly, the bottom panels 152 and 154 consist of panel sections 192, 193, 194 and 197 respectively. The top and bottom panels are substantially similar in shape and folding function in this embodiment.

To facilitate folding (retraction) and unfolding (deployment) of each aerodynamic assembly half 112 and 114, a swing arm assembly 198 and 199 is mounted to the surface of each respective door 122 and 124, and also to the upper and lower panels 162, 164, 152 and 154. More particularly, the swing arm assemblies are linked to each door-hinged panel section 162, 164, 192, 194. Each swing arm assembly 198 and 199 coordinates movement of the panel sections, which are otherwise hinged together, to cause them to fold in a predetermined synchronous fashion. That is, the door-hinged panel sections 182 and 192 fold toward each other, while the side-hinged panel sections 183 and 193 fold away from each other. The side panel itself folds inwardly toward the door. As shown particularly in FIG. 4, when the opposing side panels 172, 174 are fully folded, their rearmost (now inboard) edges 430, 432 are located in close proximity (within two inches or less spacing) along the centerline 126 between doors 122 and 124.

Note that the rearward extension of the side panels in this embodiment is generally designed to optimize the overall rearward length of the aerodynamic assembly, without causing the opposing side panels to overlap and interfere with each other when folded. In alternate embodiment, for example where regulations require the rearward extension to be reduced, the side panels can define a shorter rearward dimension, and the gap between panels when folded is accordingly larger. In an exemplary embodiment, side panels having a rearward extension, when deployed of no more than two feet can be provided. In such embodiments, the angle of inward taper of the various panels can be varied from that shown—for example to provide a steeper angle of taper on some or all sides.

Reference is now made to FIGS. 5, 6, 7 and 8, which show the right panel half 112 in greater detail. The description of this panel half also applies to the left panel half 114, which is a mirror image thereof (and functions identically), but whose description omitted for brevity.

FIGS. 5, 6, 7 and 8 particularly show the arrangement of top, side and bottom panels and interconnection therebetween in further detail. The two sections 182 and 183 of the top panel are joined at the common hinge line 185 using a plurality of living hinges 510. These hinges consist of individual strips of a durable polymer that is secured by a plurality of rivets or other fasteners to the edge of each panel section. Hinges are secured to both interior-facing (i.e. toward the inside of the assembly box) and exterior-facing (i.e. toward the outside environment) panel surfaces. Typically, hinges are placed on a side based upon how the adjoined, confronting panels are meant to fold. More particularly, hinges are illustratively located on panel sides that fold up against each other. Thus, the hinges between top and bottom panel sections are placed on exterior surfaces, as these fold toward each other as they scissor inwardly during retraction. Conversely, the respective right-angle hinge joints between the top and bottom panels and the side panel are placed long interior surfaces, as these panels ford against each other along those faces. A sufficient number of hinge strips are provided to prevent misalignment of the two adjoined panels but also to enable hinged folding without substantial resistance. In an embodiment three or four hinges are used between confronting panels, depending upon their length along the hinge line. The number of hinges used between panels can also vary depending in part upon the length of individual hinge strips. In certain embodiments, significantly longer hinge strips can be used, including full-length hinge strips where appropriate. Use of living hinges is also advantageous in that it allows for some misalignment of panels when they are folded into an overlapping arrangement. Thus, the connections are secure enough that, when unfolded, the panels assume an aligned and continuous shape. Living hinges are provided between the panel sections 182 and 183 of the top panel 162, as well as the panel sections 192 and 193 of the bottom panel 152. Living hinges are also provided at the corner joints between the panel sections 183 and 193 and the side panel 172. In this embodiment, three living hinges are provided between each panel joint. The living hinges are approximately 6 inches long and approximately 2 inches wide (width being the dimension spanning the hinge line), with approximately 1 inch of width of the hinge extended on either opposing panel. It is expressly contemplated that in alternate embodiments, the panels can be joined by mechanical hinges (for example, metal piano-style hinges or butt hinges) or another hinge mechanism of conventional design. In an embodiment, the living hinges are constructed from polyolefin plastic having a thickness of approximately ⅛ inch. The hinge fastener holes are provided generally offset from each other on each opposing side of the hinge so as to avoid stress concentrations. In an embodiment, one side receives three fasteners and one side receives two fasteners in an offset alignment across the width. Since the hinges are relatively low in profile, external placement does not materially affect the overall aerodynamics of the assembly.

The panels are themselves constructed from a weather-resistant sheet material that is durable, and stiff-but-flexible. In an embodiment, the sheet material is a composite. It can be a combination of resin and glass fibers, resin and carbon fibers, resin and polymer fibers (for example, a woven matrix) or another durable heat material. The resin can be epoxy, polyester, or another appropriate medium. In an illustrative embodiment, the sheets are constructed from a commercially available thermoplastic composite having a thickness of approximately ⅛ inch. In general, constructing panels from a sheet with a thin cross section is desirable in that it facilitates a lowered profile on the door when the assembly is folded (and stacked) against it. Typically, the sheet material desirably has a thickness of between approximately ¹⁄₁₆ and ³⁄₁₆ inch to maintain desired strength and wind-resistance, while allowing for stackability against the truck body door surface. In order to reinforce the outer edges of the panels, a series of L-shaped channel members fastened (using rivets or other appropriate fasteners) to the three, unattached edges of each panel. In this embodiment, the channel member 520 is attached to the panel section 182, member 522 is attached to panel section 183, member 524 is attached to side panel 172, member 526 is attached to panel section 192 and member 528 is attached to panel section 193. Panel members can be constructed from a durable plastic, composite or metal (such as aluminum) with a thickness of approximately ¹⁄₁₆-³⁄₁₆. It defines a height of between approximately ¼ and ⅜ inch in each dimension (i.e., each dimension of the L-cross-section). In alternate embodiments, different shapes and types of stiffeners can be used on the edges. For example, a stiff edge bead can be applied over the rear edges of each panel. The stiffening members project inwardly so as to reduce their aerodynamic drag effect. The members define a height that does not interfere with the stacking of the folded panel sections. The height of the stiffeners is in part accommodated by the ability of the living hinges to allow spread between folded panels. In addition, as described below, the door-to-panel hinges are placed on angles so that the inner edges of each folded panel define a slightly thicker stack-up than the edges adjacent to the door hinges.

The side panel 172 is attached directly to the door surface by a series of hinges 710. These hinges are standard strap-type hinges with hinge pins aligned along a common vertical axis. Shown in FIG. 5, the strap 540 of the hinge 710 extends inwardly along the door so as to clear the vertical frame section 542. The strap 540 extends rearwardly in the region of the frame member 542 to allow the panel 172 to reside relatively close to the side edge frame and truck body. This provides a more streamlined arrangement along the sides. The panel sections 182 and 192 are attached via associated hinges 550, 552, 560 and 562 that are also secured directly to the door surface. In general, hinges on all sides are secured to the door surface using conventional fasteners, such as those used to secure the standard door hinges 128. Associated washers or washer plates can be provided on the opposing (interior) side of the door (not shown) to spread the load of each hinge fastener. The placement of hinges along each panel edge is highly variable. In general, the hinges 550, 552, 560 and 562 are placed so that they do not interfere with most conventional lock rod placements (either a single lock rod per door, or double lock rods per door, as described below). In this embodiment, the inboard hinges 550 and 560 are placed approximately 6 to 9 inches from the inboard edge 640 of the panel 162. The outboard hinges 552 and 562 are placed approximately 8 to 11 inches from the outboard corner 641 of the panel 162. The hinges 710 of side panel 172 are positioned vertically near the outboard (hinged) edge of the door 122 so as to avoid interference with a wide variety of commercially-available door hinge placements common to various standard truck trailer bodies. Such door hinge placements may vary widely both in location and in number depending upon the make and model of trailer body.

Note, as used herein the term "inboard" shall refer to a location toward the center of the trailer body along a width-wise direction and more particularly to a location more adjacent to the line between the two doors 122, 124. The term "outboard" shall refer to a location more distant from the center in a widthwise direction across the body, and more adjacent to the outer sides. The term "rearward" (and variations thereof) shall refer to a direction toward the rear of the body and the term "forward" (and variations thereof) shall refer to a direction toward the front of the body. The term "up" (and variations thereof) shall refer to a direction toward the "top" of the vehicle body, while the term "down" (and variations thereof) shall refer to a direction toward the "bottom" of the vehicle body. These terms, and other locational/directional terms used herein, are merely conventions to describe relative locations and directions, and should not be taken as absolute unless otherwise stated. All directions assume the body rests on a relatively flat surface, and right-side-up, with respect to the direction of gravity.

In this embodiment, the use of four hinges 710 along the edge of the side panel 172 is sufficient to provide the desired support for the side panel 172 without fluttering or deforming in high-speed/high-airflow environments. Illustratively, the approximate placement of the three hinges 710 is at (a) 16.5 inches from the side panel top corner, (b) 37.5 inches from the side panel top corner, (c) 67 inches from the side panel top corner, and (d) 99.5 inches from the side panel top corner (or 10.75 inches from the side panel bottom corner). Other numbers of hinges and placements of hinges for securing the side panels or for securing the top and bottom panels (than that shown and described) are expressly contemplated. Moreover, the hinge arrangement shown herein is particularly desirable in retrofit embodiments where the panels are to be applied to doors of a variety of makes and models of truck trailer bodies. Where panels are applied to OEM (original equipment manufacturer) installations, the dimensions and placements described herein can vary, and be customized, to particularly suit that OEM's parameters. For example, the placement of panels with respect to doors can be adapted to a more-optimized door geometry. Also, the panels can be integrated with lighting systems to allow effective transmission of required illumination. A variety of other modifications to panels to better integrate with the door structures can be implemented in OEM versions of the arrangement in accordance with this invention. As shown more clearly in FIG. 8, the side panel 172 includes a plurality of cutouts 810 along its door-adjacent edge 820. These cutouts are designed to accommodate the particular hinge placements 128 for the subject trailer body. In a retrofit environment, these cutouts can be made by the installer using an appropriate template (not shown). More particularly, and with reference to FIGS. 6 and 7, the dimensions and angles of the deployed assembly 100 are as follows. The top panel 162 defines an angle AT of approximately 11 degrees and optionally between approximately 6 and 15 degrees with respect to the horizontal axis (perpendicular to gravity) 730. The rear-most edge 430 of the side panel 172 defines an overall height LVR of approximately 87 inches between its two opposing outside corners. The bottom panel 152 defines an angle AB of approximately 18 degrees with respect to the horizontal 730 and optionally, between approximately 6 and 30 degrees. With particularly reference to FIG. 6, the top and bottom panels 162 and 152 define a rearward depth LHD of approximately 48 inches. The panel's rear edge 620 is oriented at a slight inward angle as shown in the plan view of FIG. 6. The side panel 172 defines a deployed angle AS of approximately 13 degrees (and optionally between approximately 10 and 25 degrees) with respect to the front-to-rear direction (line 621) of the truck body. The rear edge 620 of the top and bottom panels 162 and 152 likewise defines a cross-body (perpendicular to the direction 621) width LHR of approximately 38 inches as shown. The width of the panels at the door side is approximately the same as that of the outer door frame edge 161 with appropriate clearance provided for the overlapping weather seals along the inward edge 640.

It should be noted that the stated angles AT, AB and AS are highly variable. They are provided to afford the desired degree of aerodynamic efficiency, while also allowing for practical considerations, such as ease of folding, and clearance to view required safety features such as tail lights and top marker lights. In alternate embodiments, these angles, as well as the stated dimensions of panels can be varied several degrees and/or inches. Moreover, in the illustrative embodiment, the placement of the bottom panel 152 is shown as upwardly inboard with respect to the bottom edge 750 of the side panel 172. This is to allow for clearance of the lock rods 220 when the panels are in a folded orientation (see FIG. 4). The continued skirt with curvilinear bottom edge, which resides below the hinge joint with each bottom panel slightly increases efficiency. This extended bottom side skirt also provides a pleasing, aesthetic effect by giving the impression that the entire door is fully enclosed by the aerodynamic fairing. This skirt feature can be omitted in alternate embodiments. Moreover, where lock rod actuation mechanisms are provided in a different arrangement than the conventional configuration as depicted, the bottom panels can be extended further downwardly to cover more of the overall door surface.

Figure 9:
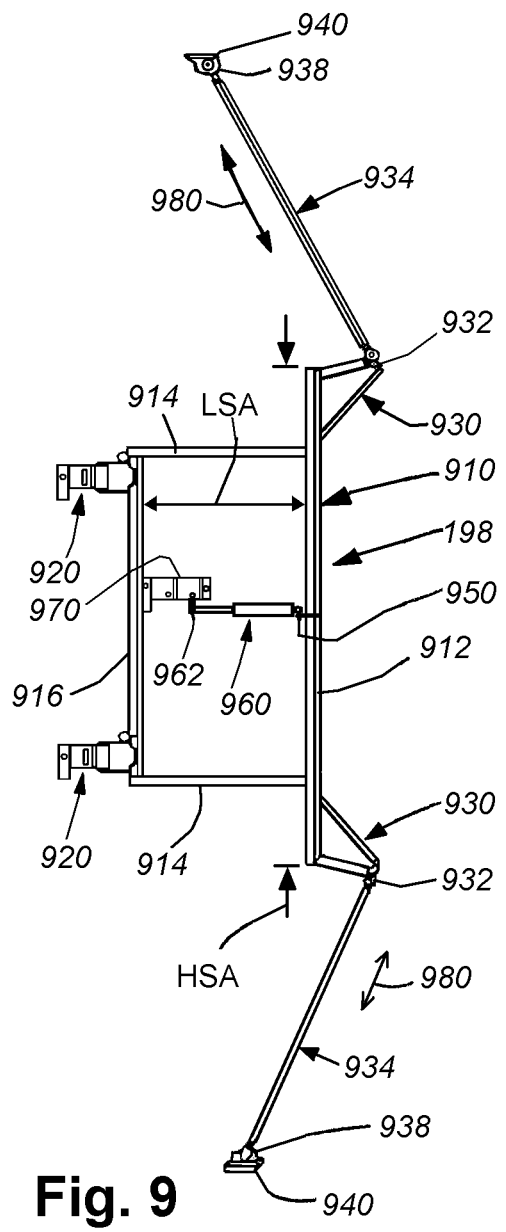
FIG. 9 is a side view of a swing arm assembly for coordinating movement of the panels of the aerodynamic assembly of FIG. 5.

Reference is now also made to FIG. 9, which shows swing arm assembly 198 in further detail. The swing arm assembly 198 consists of a main frame 910 with an outer vertical beam 912, a pair of interconnected horizontal arms 914, and an inner vertical beam 916. The inner vertical beam 916 is attached, at two opposing, to each of a pair of hinge assemblies 920, respectively. In an embodiment, the swing arm members are constructed from square steel members with appropriate corrosion-resistant coating(s) applied thereto. The members are welded together using conventional techniques. In an alternate embodiment, one or more of the members can be constructed from a differing metal or a synthetic material (polymer, composite, etc.). Likewise, the swing arm can be molded or formed as a unitary member, with or without substantial hollow spaces (voids) between interconnected members.

Figure 5:
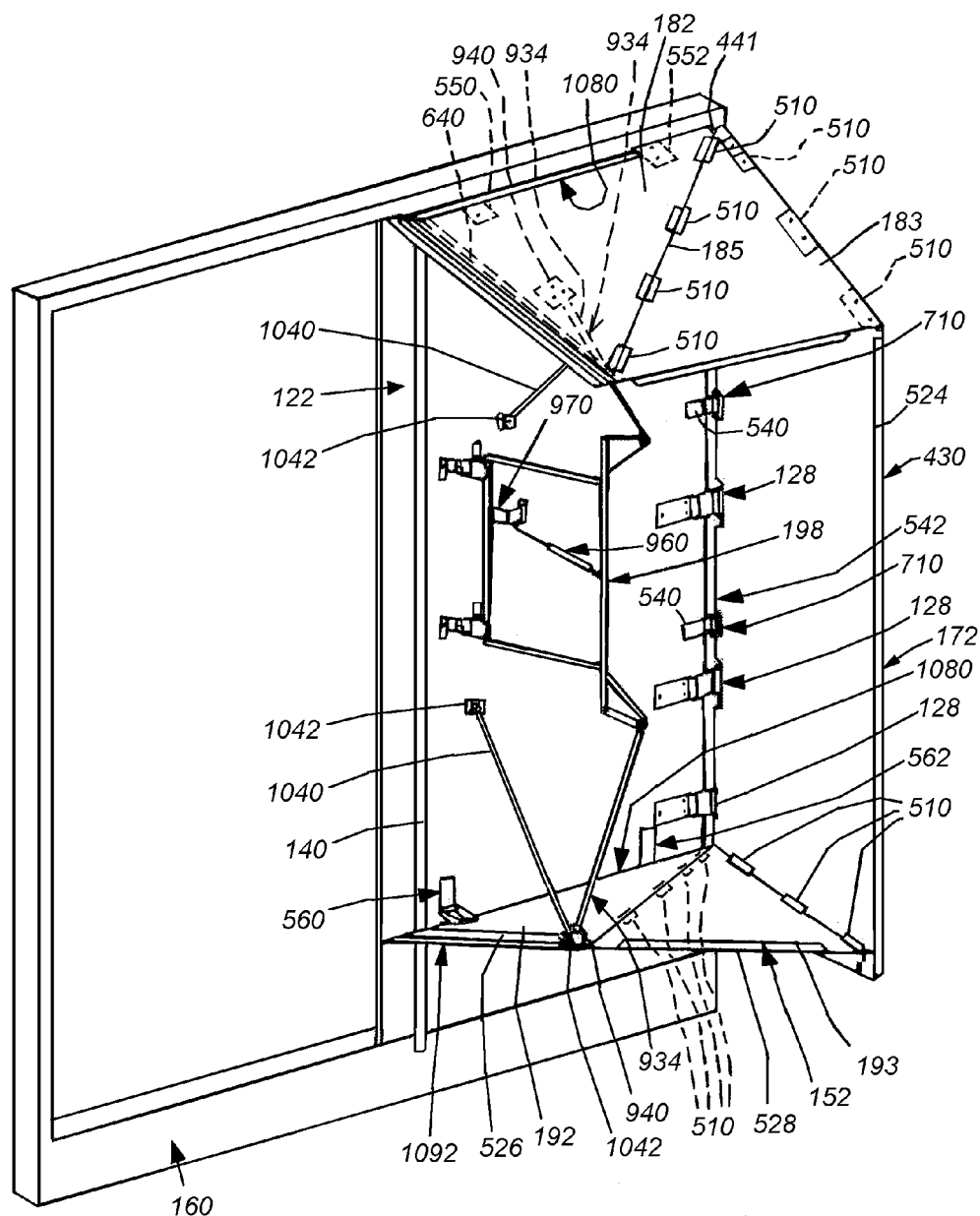
FIG. 5 is a partial perspective view of a single, right-hand door of a truck trailer body of FIG. 1 showing the associated right half of the aerodynamic assembly in the deployed orientation, the unshown left half being a mirror image thereof.

As shown for example in FIG. 5, the hinge assemblies of the swing arm assembly 198 are each mounted to the surface of the door 182 near its inboard edge 580. In an embodiment, the hinge assemblies 920 are mounted on the door 122 at a distance WH of approximately 12 inches with respect to the inboard door edge 580. The hinge assemblies 920 are attached using conventional fasteners that pass through the door for secure attachment. The hinge assemblies 920 enable the swing arm, consisting of the interconnected vertical and horizontal frame members 912, 914 and 916, to rotate as a unit toward and away from the door surface. In an embodiment, the opposing ends 930 of the outer vertical member 912 include triangular braces that each provides respective attachment points 932 for each of a pair of tie rods 934. A ball joint or other interconnection, which allows for movement in a multiple degrees of freedom, is used at each attachment point 932. The opposing ball joint (or other connection) 938 is attached at the opposing end of each tie rod 934. These connections join to bases 940 on the top section 182 and bottom section 192. The bases 940 are mounted approximately halfway along the front-to-rear distance of the panel section edge (640) and approximately 3-6 inches from the inboard edge (640). Other locations for placement of the illustrative tie rod connections on respective panels are expressly contemplated.

In addition, the swing arm assembly's vertical member 912 is interconnected by a pivot 950 to one end of a gas spring assembly 960. The gas spring assembly 960 can have a resistive spring force of approximately 70 lbf in an illustrative embodiment. Gas springs with alternate force levels are expressly contemplated. In an embodiment, a gas spring model 89U150368BB0312 (available from Industrial Gas Springs, Inc. of Eaton, Pa.), is employed by way of example. The opposing end of the gas spring assembly 960 is mounted by a pivot 962 to a base 970 that resides on the surface of the door 122. The base 970 is mounted using conventional fasteners that, like other elements herein, pass through the door and are secured by nuts, washers and/or other appropriate fastening mechanisms. Advantageously, a gas spring provides both a damping resistance to cushion deployment, and a predetermined spring force to ensure full deployment and resist retraction due to airflow, in a single package. Thus, when the folded panel assembly is released, the gas spring 960 extends at a predetermined (damped) rate under the force of its spring. When the frame assembly 198 pivots on its hinges 920, it moves tie rods (double arrows 980) between folded and deployed orientations. In the folded orientation, the assembly resists the spring force, compressing the spring as the frame is oriented flush against the surface of the door. In the deployed orientation, the gas spring 960 forces the swing arm to rotate outwardly toward the edge 161 of the door frame 160, thereby causing the tie rods 934 to bias the top and bottom panels 162, 152 away from each other during deployment (the top tie rod biasing its panel 162 upwardly, and the bottom tie rod biasing its panel 152 downwardly downwardly). Thus, in the folded orientation, the top and bottom panel sections 182 and 192 are simultaneously drawn inwardly toward each other (the top panel 182 being downwardly and the bottom panel 192 being drawn upwardly) by the tie rods. Conversely, when the gas spring forces the swing arm outwardly, the tie rods bias the folding top panel upwardly and the folding bottom panel downwardly. Because the top panel door-hinged section 182 and bottom panel door-hinged section 192 are joined to respective top panel sections 183 and 193, these panels are also folded inwardly toward each other along the hinge line with the side panel 172. This folding action further causes the side panel to be drawn inward toward the door surface on its hinges 710. Thus, the action of the swing arm 198 simultaneously moves all panels between the folded and deployed orientations. In an embodiment, the outward length of the swing arm LSA is approximately 16.5 inches. Likewise, the height HSA of the vertical member 912 is approximately 37.25 inches. Each tie rod has an overall length of approximately 24 inches. This overall rod length is adjustable in an illustrative embodiment, since the opposing ball joint connections include a threaded stem (see, for example, stems 1020 in FIGS. 10 and 11) that seats into a threaded well in each end of the rod body. This adjustability allows for fine tuning during assembly. The tie rods, fittings and other swing arm components can be constructed from a corrosion-resistant material, such as stainless steel or a durable aluminum alloy.

Figure 10:
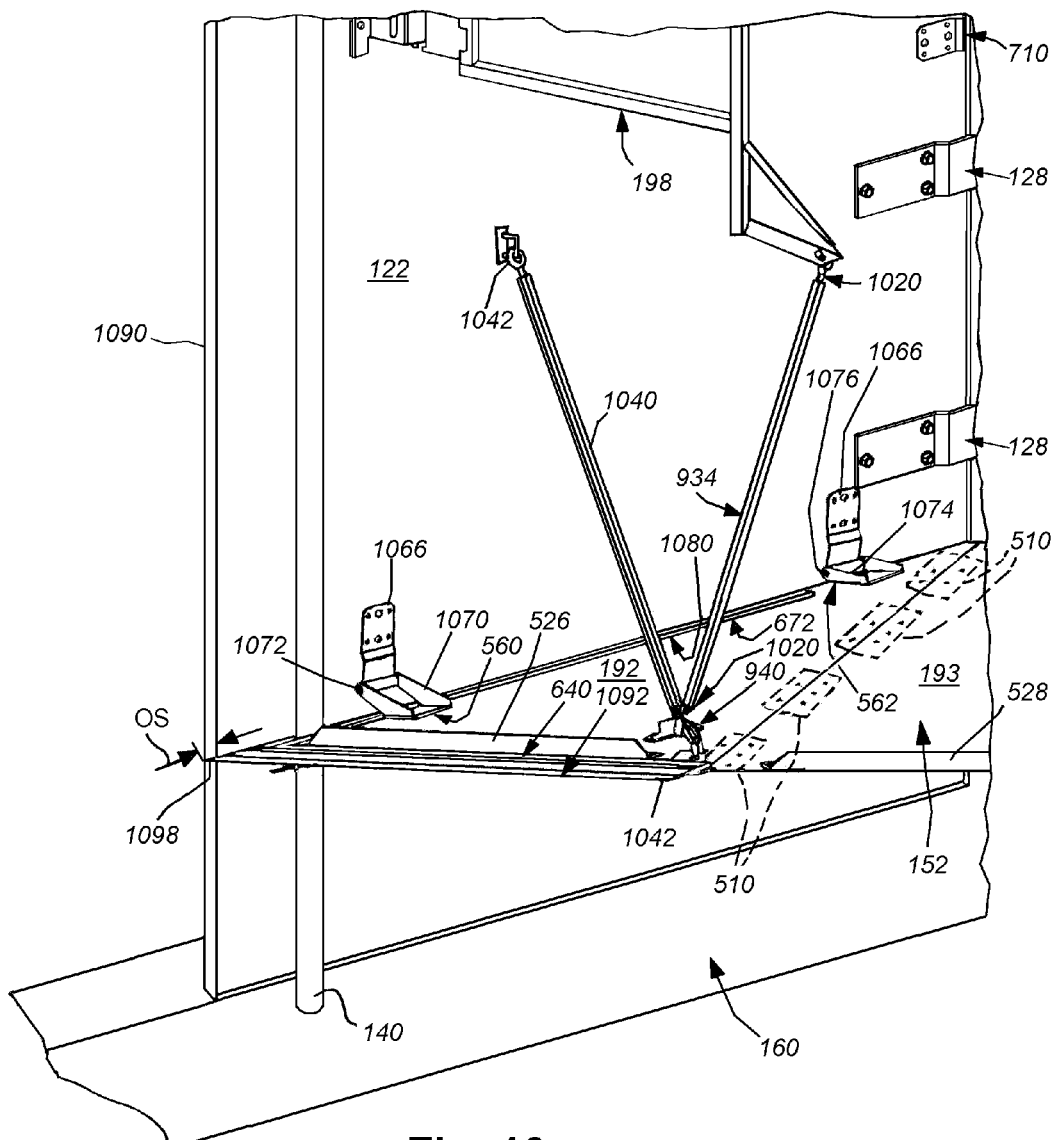
FIG. 10 is a partial perspective view of the right-hand door of the truck trailer body of FIG. 5 showing a portion of the bottom panel of the right half of the aerodynamic assembly attached thereto.
Figure 11:
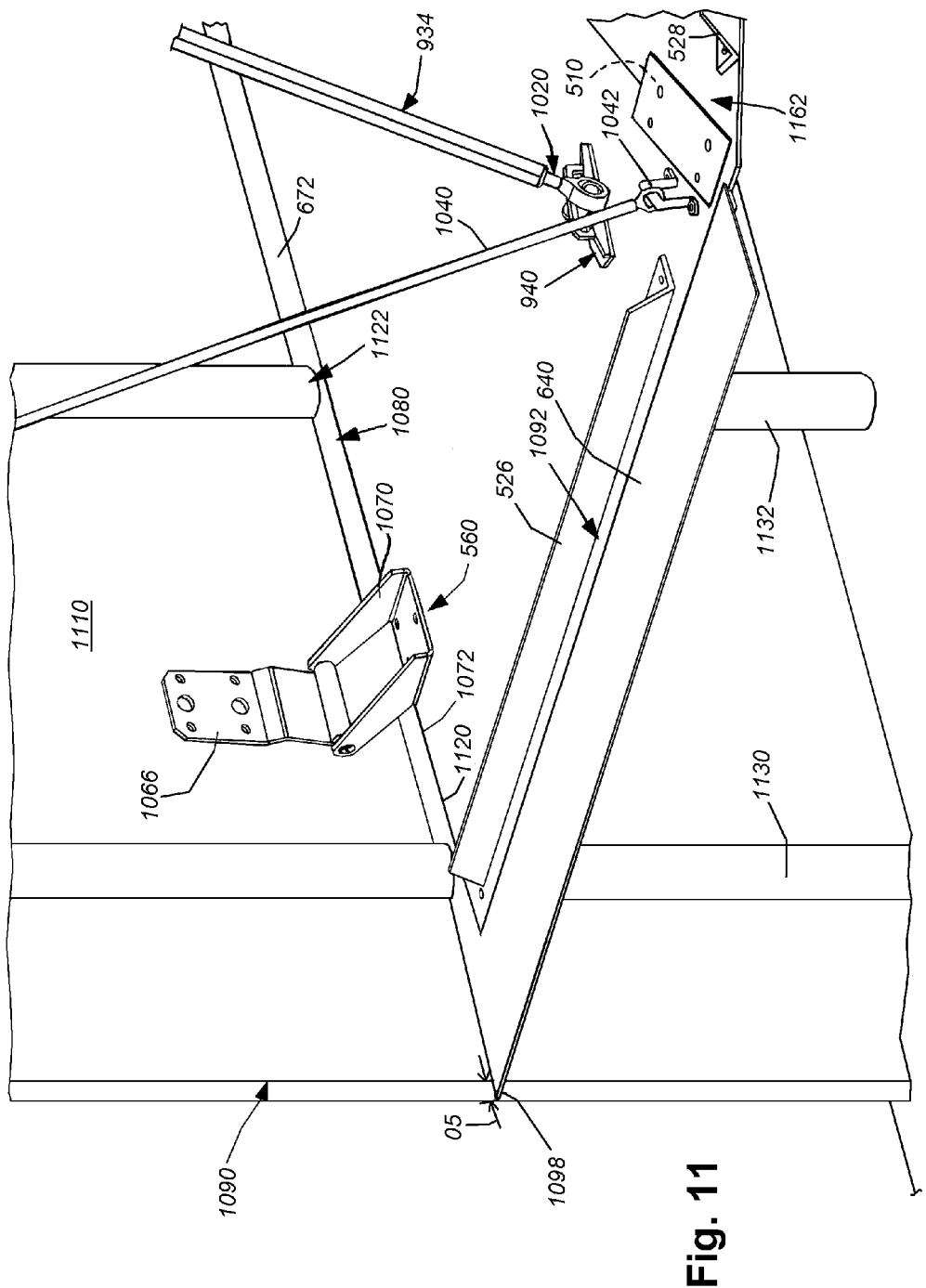
FIG. 11 is a partial perspective view of a right-hand door of a truck trailer body according to an alternate embodiment, which includes two, side-by-side lock rods per door, showing the weather seal of adaptation of the bottom panel to accommodate those two lock rods.

With further reference to FIGS. 10 and 11, fine tuning of the tie rod lengths is desirable, in part, because the sections 182, 183 and 192, 193 of the respective top and bottom panels 162 and 152 are typically maintained at a slight non-planar orientation with respect to each other. That is, as shown in FIG. 10, in a fully deployed orientation, the top and bottom panels 162, 152 define a slightly inward fold (an external valley) that generates a relative valley angle AF therebetween. That is, the plane (line 1030) of the depicted panel section 192 is angled with respect to the plane 1040 of the panel 193. Providing a slight non-planar valley angle (inwardly directed fold) between the panel sections ensures that each panel can be moved to the folded orientation free of any season by the top and bottom panels. In an embodiment, the valley angle AF of the top panel 162 valley is approximately 2 degrees and the valley angle AF of the bottom panel 152 is approximately 22 degrees—a somewhat more aggressive angle, since this panel is partly removed from direct airflow thereover, and this large angle assists in allowing ease of folding of the assembly.

By way of further explanation, if the top and bottom panels were completely planar, and the user desired to fold the side panel so as to actuate the overall folding motion via the swing arm, the top and bottom panels might seize up due to their planar orientation. By inducing a small inner fold in each panel, the swinging motion of the side panel causes immediate, inwardly directed (toward each other) buckling of the two respective panel sections for each of the top and bottom panels. This buckling allows the tie rods 934 to move and rotate inwardly toward the door, which in turn, causes the swing arm to rotate on its hinges so as to compress the gas spring assembly 960. In order to induce the slight inward valley angle AF between panel sections 182, 183 and 192, 193, each door-hinged panel section 182 and 192 includes an attached cable 1040 (note that the cable can be alternately attached to the side panel-hinged section 183, 193). Each opposing end of each cable is attached to an associated footman's loop 1042 (or other appropriate base), with one cable end thereby attached to the panel and the other cable end attached to the door 122. One or both ends of the cable can include a turnbuckle, or other length-adjuster (not shown), to accurately adjust the cable's overall length. Thus, when fully deployed, each cable 1040 acts as a stop to prevent further outward movement of the panel sections 182 and 192. This, accordingly, prevents overextension of the swing arm assembly 198 while still allowing full deployment of the assembly 100. As noted, the valley angle AF between panel sections that is created by each cable's restraint does not appreciably alter the overall aerodynamics of the unit.

Notably, the force of the gas spring 960, acting through the swing arm assembly 198, provides sufficient holding strength to maintain the aerodynamic assembly in a deployed position without fluttering of folding even at substantial highway speeds and under high wind conditions in all directions. However, the spring's force can be overcome easily to allow deliberate folding/retraction of the assembly by simply grasping and rotating the side panel toward the door surface, as described further below, simply opening the door and moving it toward the body side so as to induce the assembly to collapse as the side panel engages the body side.

Moreover, as described further below, the gas spring 960 provides a sufficient bias force to the swing arm assembly 198 so that, when released, the folded panel assembly on each half is capable of "one-touch" (i.e. releasing the catch via the release cable 1422) "automatic deployment." That is, by only releasing the catch, the spring thereafter biases the swing arm assembly to rotate outwardly from the door, thereby expanding the inwardly folded top and bottom panel sections and causing the side panel to rotate outwardly into the deployed orientation free of the user's grasping and pulling of the panels themselves. In other embodiments as described below and in the above-incorporated U.S. patent application Ser. No. 12/122,645, published as U.S. Published Application No. 2008/0309122 A1, filed May 16, 2008, entitled REAR-MOUNTED AERODYNAMIC STRUCTURE FOR TRUCK CARGO BODIES, other mechanisms for enabling retention of panels in a folded position and automatic deployment (e.g. user or speed-actuated activated actuators) are expressly contemplated instead of 9 or in addition to) a spring assembly.

One consideration with the folded panel assembly is that the door lock rod(s) and other surface mounted components generate a profile that extends approximately 1-2 inches rearwardly of the door's surface. These structures are generally inboard near the inboard door edges/seam. A number of geometric adaptations are provided to accommodate these (often) preexisting structures so as to allow the assembly to fold-up free of interference by, or with these structures. With reference to FIG. 10, and further reference to FIGS. 12 and 13, the top and bottom panels 162 and 152 are attached to the door 122 by respective hinges 550, 552 and 560, 562. The hinges each include a door bracket 1066 that is secured to the door 122 using conventional fasteners. The door brackets support a hinge pin that allows a panel bracket to rotate with respect thereto. In particular, the inboard hinges 550 and 560 include an attached panel bracket 1070 that offsets the hinge pin (axis) 1072 at a predetermined distance that is different (greater than) that of the hinge pin (axis) 1076 of the attached panel bracket 1074 the outboard hinges 552, 562. More generally, each of the top and bottom panels 162 and 152 are oriented parallel to the ground surface (e.g., perpendicular to the direction of gravity) while their hinges define axes that are angled with respect to the horizontal as shown. In this embodiment, the angle AHA is approximately 2-3 degrees, and illustratively the angle AHA is approximately 2.08 degrees. By angling the hinge axes inwardly toward each other, the top and bottom panels define a larger gap with respect to the door surface near the inboard edge of the door when they are folded. This allows the folded top, bottom and side panels (particularly door-hinged panel sections 182 and 192) to clear the lock rod 140 and the swing arm assembly 198. In other words, the folded panels form a rearwardly tapered pocket that is deeper near the center. This pocket has sufficient clearance, due to the geometry of the hinges 550, 552, 560, 562 to provide a space in which the swing arm and the lock rods can reside without binding on the folded panels. This geometry is largely determined by the dimensions of the panel bracket of each hinge and its relative pin placement. In an alternate embodiment, a larger number of hinges (more than two per panel) can be provided along the width of the door, with appropriately-sized panel brackets that allow each hinge pin to align along the angled overall hinge axis.

Figure 6:
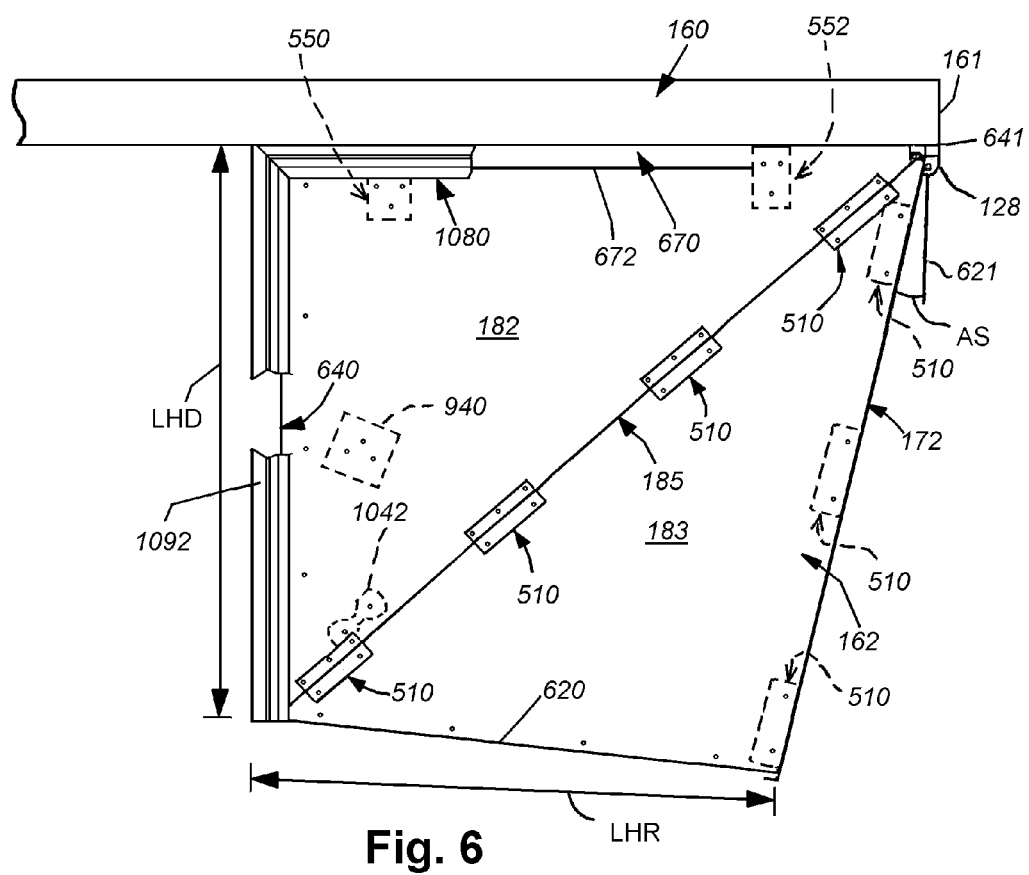
FIG. 6 is a top view of the right half of the aerodynamic assembly of FIG. 5.
Figure 7:
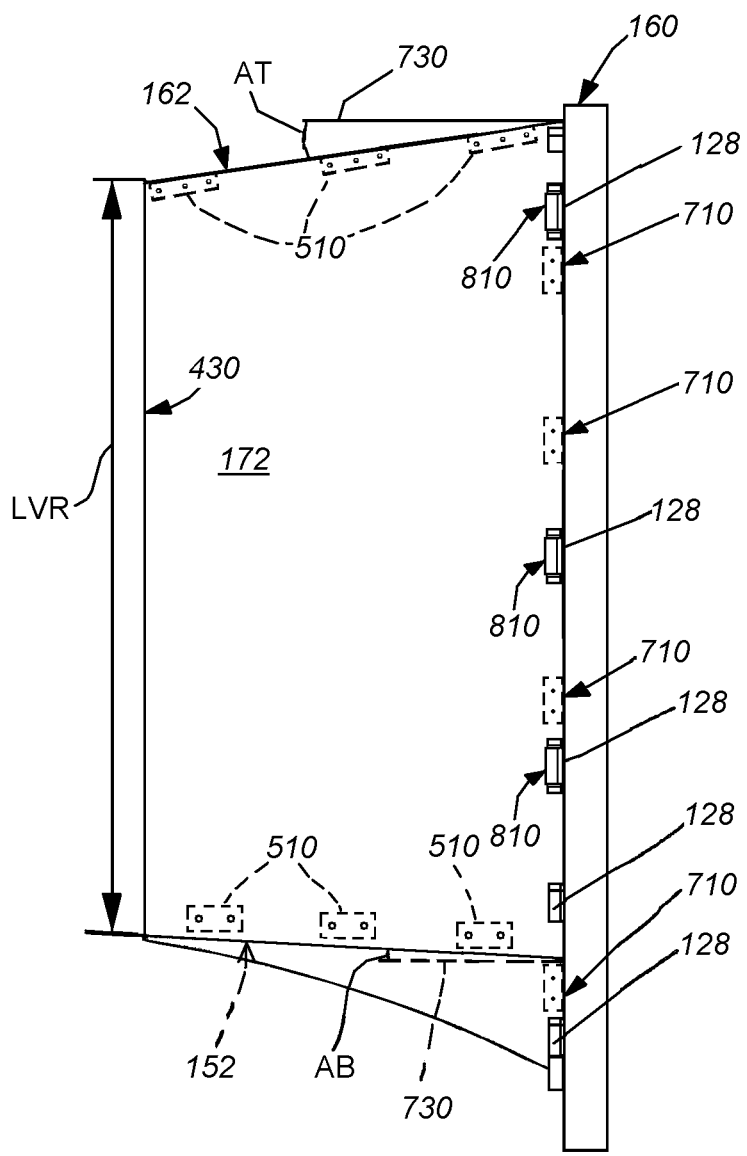
FIG. 7 is a side view of the right half of the aerodynamic assembly of FIG. 5.
Figure 8:
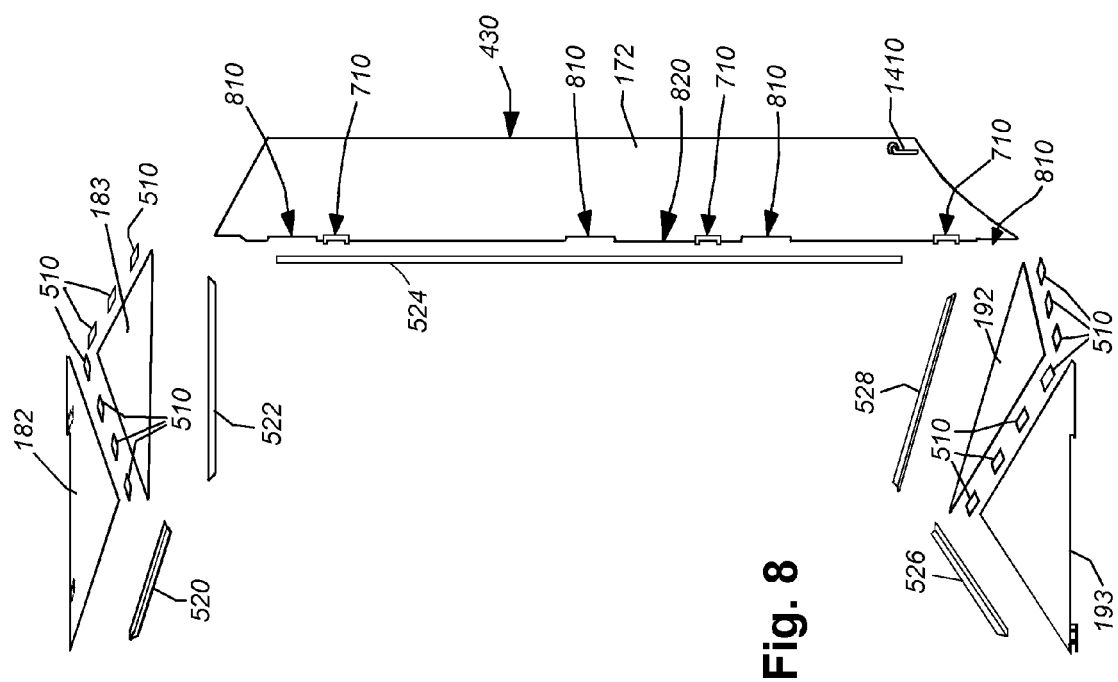
FIG. 8 is an exploded view of the right half of the aerodynamic assembly of FIG. 5 showing panels, living hinges for joining panels and panel edge stiffeners according to the illustrative embodiment.

As shown in FIG. 6, the top and bottom panels 162 and 152 also include a cutout 670 (revealed partially where the rear weather seal has been removed) defined along a portion of the inboard, door-facing edge 672. With further reference to FIGS. 10 and 11, the cutout provides clearance for the lock rod 140. The panel hinge bracket 1070 is designed to bridge this gap 670. While omitted in FIG. 6 for clarity, the gap 670 typically includes a weather seal 1080. The weather seal typically comprises a durable, flexible elastomeric compound, such as rubber, polyurethane or silicone. It can include an embedded metal stiffener and/or internal edge clips according to a conventional design. It is seated over the lip of the panel edge 672 in the region of the gap 670. Its free edge engages and seals against the door's surface to eliminate infiltration of air flow, thereby increasing the aerodynamic efficiency of the assembly. The seal 1080 is closely cut around the lock rod 140 as shown with a minimum of excess space between the lock rod and the seal. Based upon this design, the top and bottom panels 162 and 152 can be adapted to a variety of lock rod positions. Notably, as shown in the alternate example of a door 1110 in FIG. 11, a pair of lock rods 1130 and 1132 is employed on each door instead of the single lock rod 140 described above. This is a common arrangement on certain trailer bodies. The panel cutout 670 is long enough to accommodate most common arrangements and placements of lock rods, thereby increasing the versatility and retrofitability of the design. In this embodiment, the seal 1080 is cut with close-conforming slots 1120, 1122 to respectively accommodate each of these lock rods 1130, 1132 without compromising the overall aerodynamic seal between the panel and the door surface.

The geometry of the top and bottom panels 162, 152 is further adapted to allow for a pair of seals where the panels join at the inboard edge. As shown, the inboard edge 640 (revealed partially in FIG. 6 where the weather seal 1092 has been removed) of the top and bottom panels 162, 152 is positioned at an offset from the edge 1090 of the door 122. A gap of between approximately ¾ inch and 1½ inch is provided between the edge 640 and the centerline of the body. As shown, the weather seal 1092 seats over the lip of this edge (640) in a conventional manner, and the attached seal 1092 extends slightly beyond the door edge 1090 and body centerline (overlap OS shown in FIG. 10). In this manner, the two weather seals 1092 on the panels of each door overlap each other by approximately ¼-¾ inch to form a lapped seal that prevents air infiltration. The resilience of the seals caused them to engage under modest pressure in the overlapped relationship to secure the air-resistant seal. The overlap is not so great as to cause the panels to interfere with each other during folding or unfolding. In other words, when one panel is folded, the seal 1092 passes over the opposing, overlapping seal without substantial resistance. Note that the seals 1080 and 1092 on each panel can be formed from the same, commercially available weather seal material. The two seals 1080 and 1092 can be joined at the rear corner 1098 using a 45-degree miter joint. The two mitered ends can be cemented together using an appropriate adhesive or sealant (silicone or polyurethane adhesive, for example), thereby providing an L-shaped weather seal structure. It is contemplated in an alternate embodiment that the two centerline seals 1092 can be replaced with a single wider seal on the top and bottom panels of only one side, which engages an unsealed edge of the opposing top and bottom panel, respectively. Alternatively the seal on one side can be wider than that of the other. In any of these embodiments, the edge 640 of a panel may extend further toward the centerline than that of the opposing panel.

Figure 12:
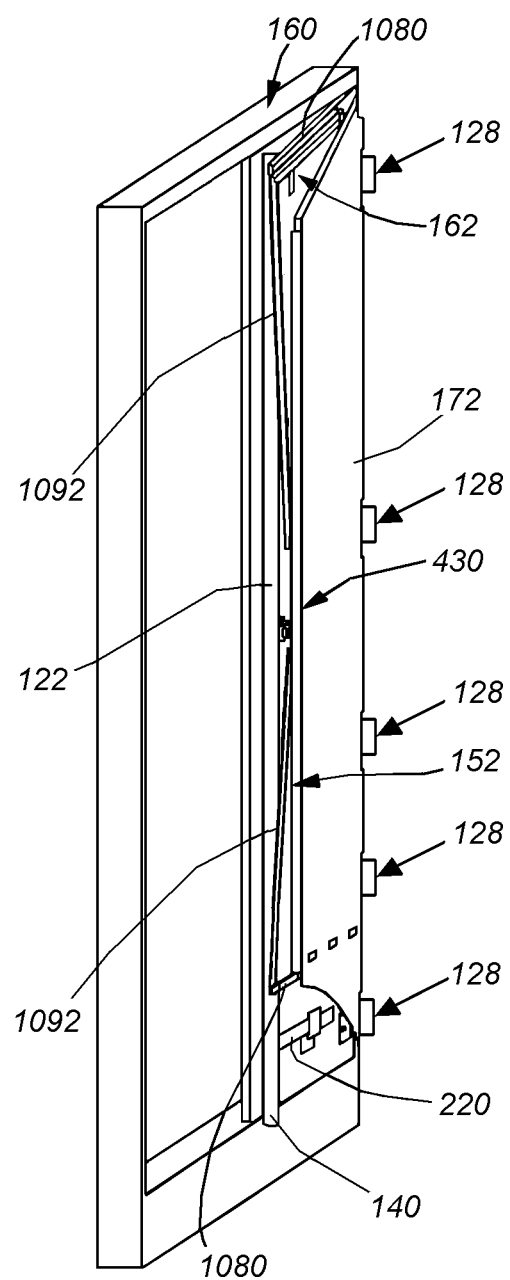
FIG. 12 is a side perspective view of the right-hand door and associated right half of the aerodynamic assembly of FIG. 5 in a folded/retracted orientation, further detailing the stacking relationship between interconnected panels.
Figure 13:
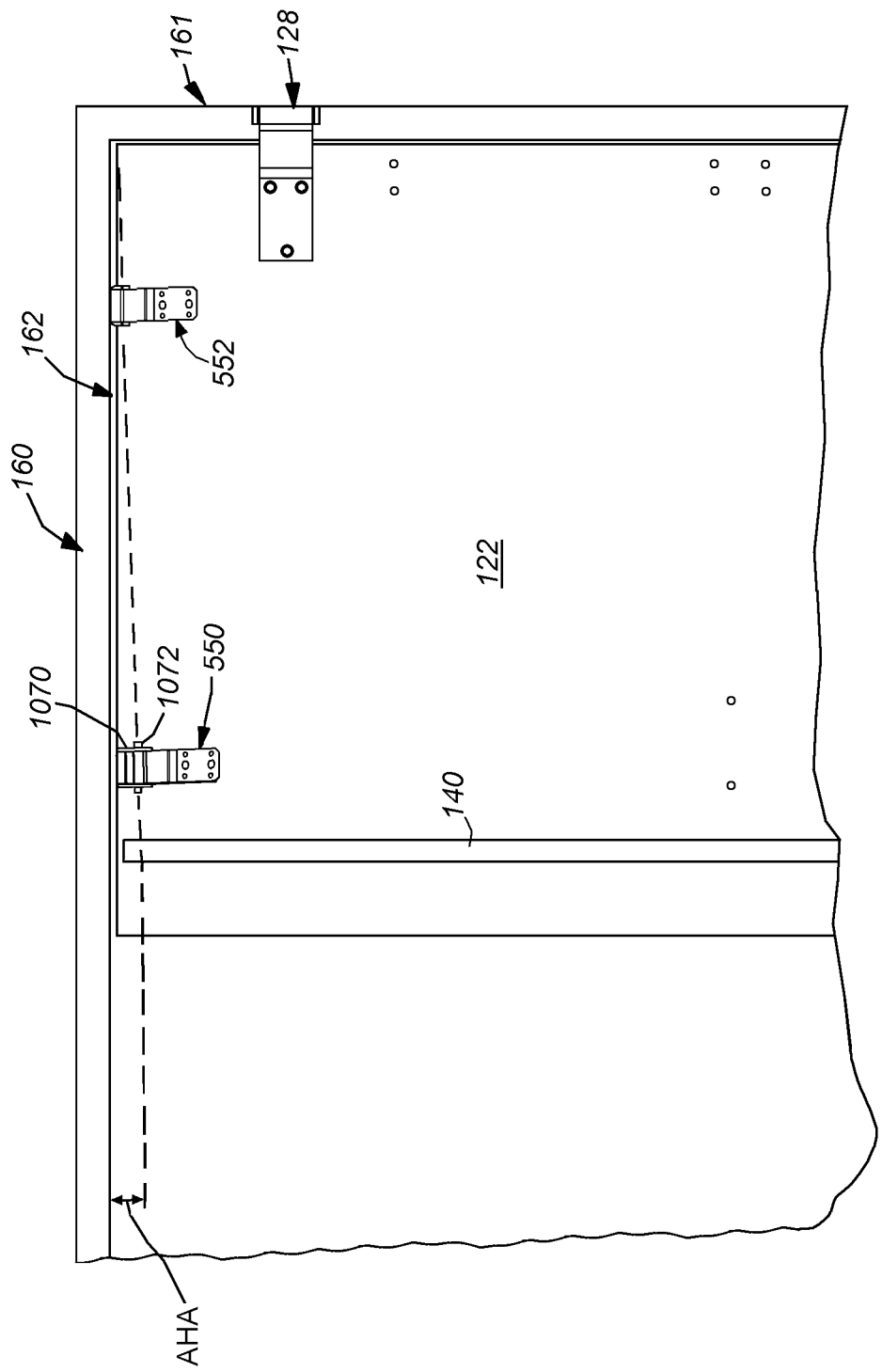
FIG. 13 is a fragmentary rear view of the door and aerodynamic assembly of FIG. 5 showing the angled hinge axis defined by the top and bottom panel hinges with respect to the door to facilitate flush folding of the panel assembly.

This folded orientation is shown in side perspective view in FIG. 12. The side panel 172 is shown overlapping the bifolded top and bottom panels 162 and 152 with sufficient clearance to avoid binding on the lock rod 140. The above-described weather seals are disengaged from the door surface and face upwardly and downwardly as shown.

While the weather seals described herein are press-fitted over the lips of panel edges, it is contemplated that alternate attachment mechanisms can be employed. For example a clip edge into which the seal seats can be attached to various panel edges. This can double as an edge stiffener in certain embodiments. Likewise, seals can be attached by fasteners to the panel edge. It is also expressly contemplated that other seals or rigid/semi-rigid fairings can be applied to various joints between panels and/or between panels and trailer body components. For example, a seal or fairing can be applied between the side pane's door-facing edge and the body's door frame side 161 to further seal against air infiltration and enhance the aerodynamic profile of the assembly.

Figure 14:
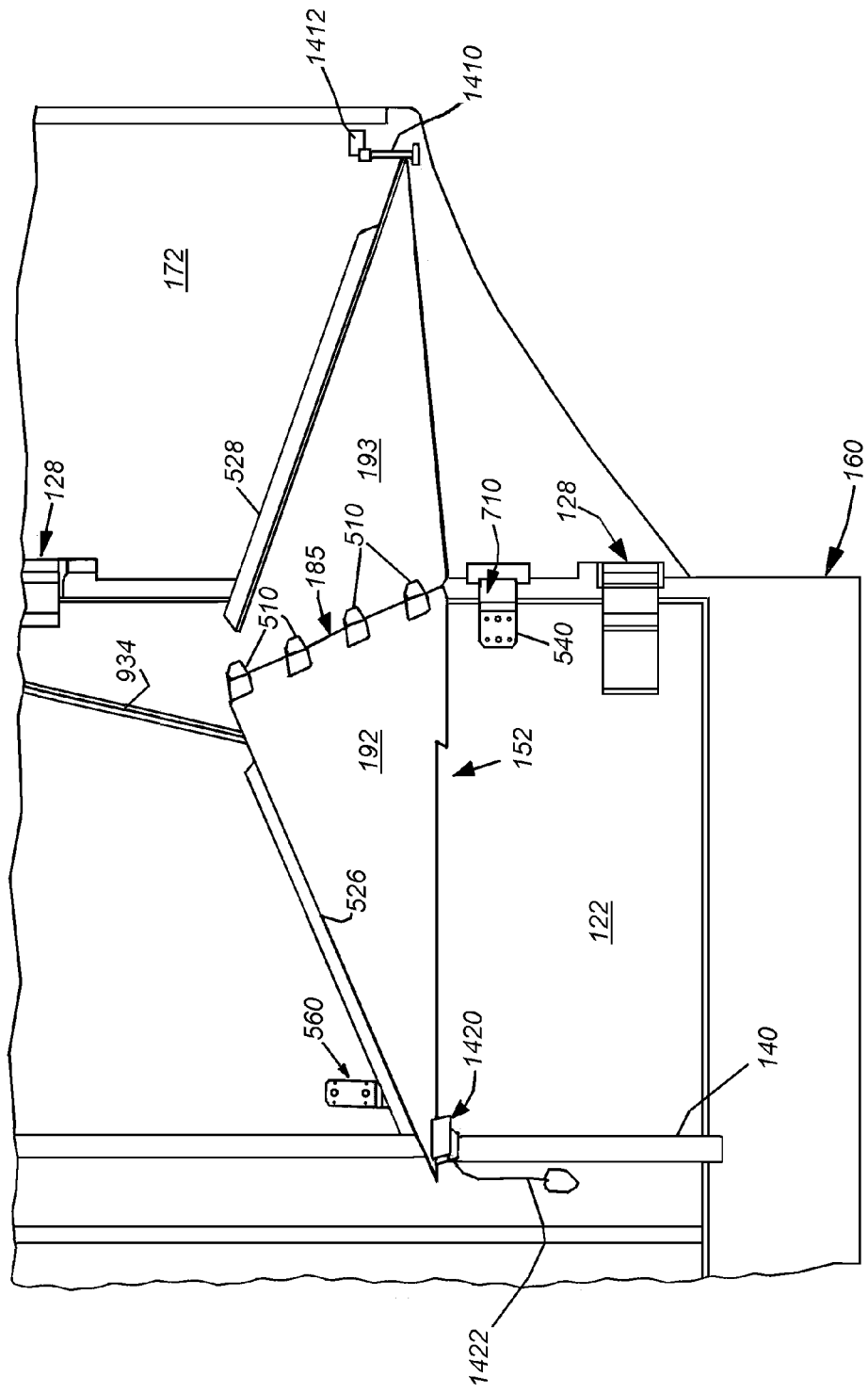
FIG. 14 is a fragmentary perspective view of the side panel and bottom panel of the right half of the aerodynamic assembly, according to an illustrative embodiment, showing a latching mechanism for securing the assembly in a folded orientation.

To maintain the assembly in the depicted folded orientation of FIG. 12, a latching mechanism is provided to each half of the aerodynamic assembly according to an illustrative embodiment. With reference to FIG. 14, the latching mechanism of this embodiment consists of a pin 1410 that is mounted to the rear bottom edge (along the interior face) of the side panel 172 using a bracket 1412. The pin 1410 faces projects vertically and downwardly along the interior surface of the side panel 172. In an embodiment, it can be constructed from a ¼-½ inch diameter bolt of an appropriate grade and type of metal. The pin 1410 projects slightly below the adjacent edges of the bottom panel 152. A corresponding latch assembly 1420 is provided near the inboard centerline. In this embodiment, the latch is mounted on the exterior (facing outside the assembly) surface of each bottom panel. The latch can be any acceptable design. In this embodiment, the latch comprises a standard pin-capture latch that automatically receives and restrains the pin when it passes through the spring-loaded latch gate. Since the latch is fastened to the outside face of the bottom panel, it becomes aligned with the pin only after the bottom panel rotates into an approximately vertical alignment to face upwardly in the folded orientation. The latch assembly 1420 can include appropriate springs and other mechanisms that allow it to maintain capture of the pin 1410 until it is released. A release cord 1422 can be provided on the release mechanism of the latch assembly 1420 according to a conventional arrangement.

It should be noted that the depicted latch assembly is one of a variety of techniques for securing the assembly in a folded orientation. In an alternate embodiment, a simple eyebolt and hooked chain can be used—running between the side panel and the door surface. Likewise a bar or shock cord can be applied between the adjacent, folded side panels. As described further below, a latch can be omitted entirely.

In operation, when the user desires to retract and fold the assembly, he or she grasps the edge of the side panel and rotates the side panel toward the door surface. This causes the top and bottom panels 162 and 152 to begin scissoring toward each other along their hinge line 185. The scissoring effect causes the door-hinged panel sections 182 and 192 to rotate inwardly, toward each other, which biases the attached tie rods 934. This, in turn, causes the spring arm to work against the spring force of the gas spring, folding the entire arrangement in a coordinated manner. As the folding is completed, with the side panel moving into a confronting relationship with the door surface, the pin 1410 is finally captured by the latch assembly 1420, which thereafter retains the entire assembly in place, folded flush against the door. To deploy the assembly, the user simply releases the latch assembly 1420 by pulling on the cord 1422, and the gas spring operates to bias the swing arm outwardly from the door surface. This, in turn, unfolds the top and bottom panels, along with the interconnected side panels.

Note that the inherent damping effect of the gas spring is also advantageous in that it resists sudden impulse from jarring and gusts as the vehicle travels down the roar, but allows a firm, continuous force, applied during the folding action to be transmitted to overcome the spring force. The damping action also ensures that during deployment, the assembly gently attains its final unfolded orientation without a shock.

The geometry of the assembly allows for relatively low levels of applied force to fold each half of the assembly against its underlying door (termed "self-collapsing" herein). As noted above, in an embodiment the assembly can be folded simply by opening the door 122 and rotating it into its 270-degree fully opened position against the side of the truck body. Once fully opened, the door is latched against the truck body side using (for example) a conventional door mounted eye-bolt (or chain) and body-mounted hook arrangement (not shown). In such embodiments, the latch mechanism 1410 and latch assembly 1420 can potentially be omitted. This assumes that the assembly will remain deployed at all times when the door is opened.

Like automatic deployment, the above-described capability of the assembly half to "self-collapse" uniquely enhances the practicality and ease of use of the aerodynamic assembly half in accordance with various embodiments. It reduces the number of steps needed to access the interior of the body or otherwise move the panels out of rearwardly deployed orientation. In particular, the user need only reach for, and unlatch the door lock rod, grasp and rotate the door into engagement with the side of the vehicle body (as self collapsing occurs) and secure the door to the body with a conventional hook. As it folds, the bottom panel and side panel can become secured together using their respective latch members (1410, 1420), for subsequent release (via pull cord 1422) when the door is again closed and secured for travel.

Figure 15:
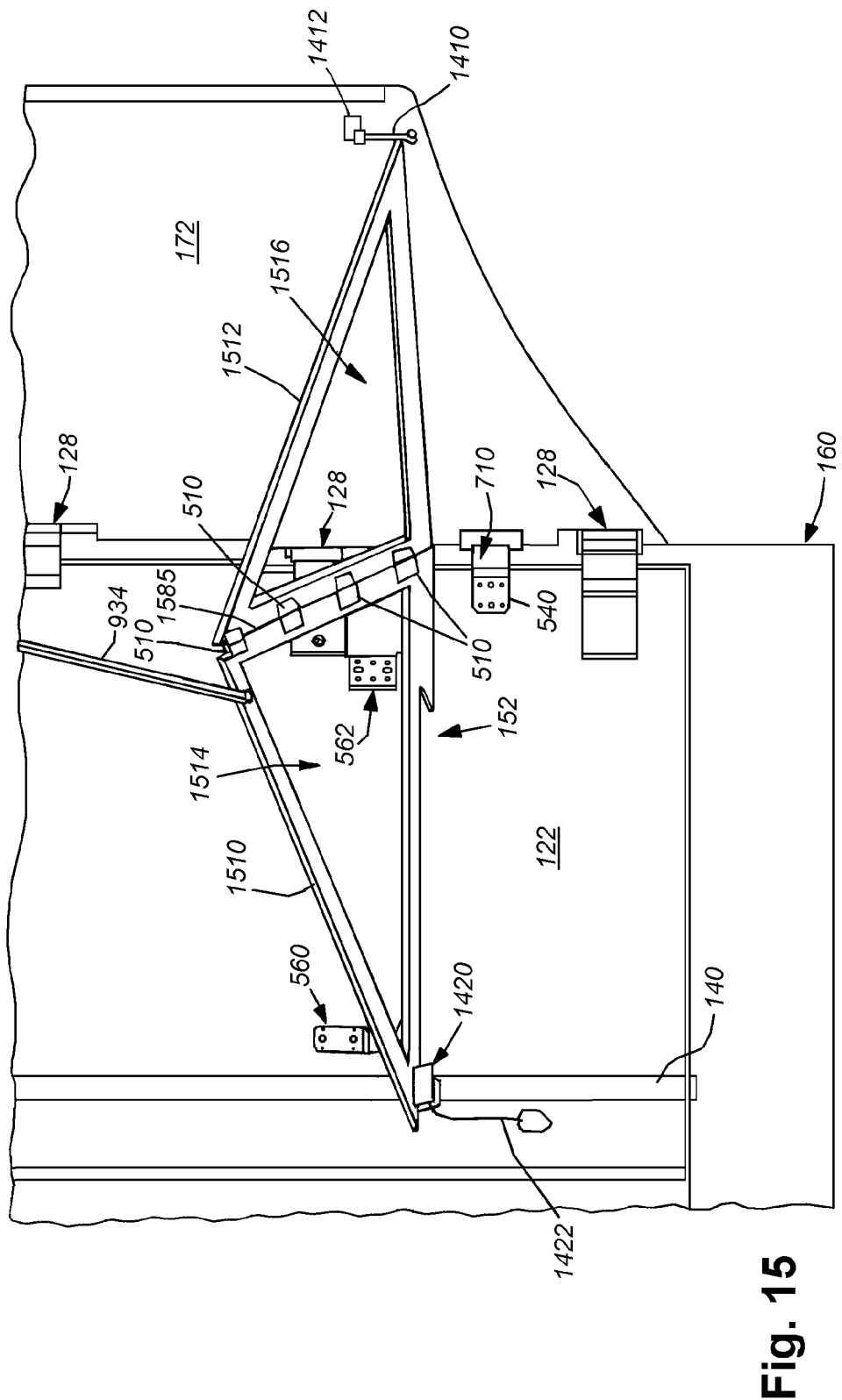
FIG. 15 is a fragmentary perspective view of the side panel and bottom panel of the right half of the aerodynamic assembly, according to an alternate embodiment, in which the bottom panel is defined by an open framework so as to avoid accumulation of snow and debris thereon.

With reference to FIG. 15, the assembly's bottom panels can be provided as an open-frame geometry according to an alternate embodiment. Each of the bottom panels has been cut out, or otherwise formed from structural beam members, so that the outer frames 1510 and 1512 encompass a respective central opening 1514 and 1516. This open frame geometry has been adapted to reduce or eliminate the possibility of infiltration and/or accretion of snow, mud and the like, which is common particularly in Northern climates. While there is a slight decrease in the aerodynamic performance, it is counterbalanced by an increase in practical usability (for example, where snow may otherwise accumulate on a full bottom panel, and restrict or prevent retraction). The swing arm tie rod 934 is unchanged in this embodiment, and is attached to the outer frame 1510 of the panel, so that it functions in the same manner as set forth above. More particularly, the illustrative open framework functions in the same manner as the bottom panel sections 192 and 193 of FIG. 14. They are hinged together along a hinge line 1585 using resilient, living hinges as described above. The rigid components of the framework are composed of steel, aluminum, composites (fiberglass, carbon fiber, etc.), or the like. Note also that additional stiffening members, cross braces, etc. can be attached on and/or between the framework members that are depicted. These members should still allow for the minimal accretion of snow and debris. For the purposes of this description, the terms "bottom panel" and "bottom panel section" shall be taken to include open framework structures and their hinged sub-components.

Of course, it is contemplated that a differing geometry for achieving an open framework construction can be provided in alternate embodiments, generally with the goal of providing open space that prevents accretion of snow and other debris without compromising the rigidity of the overall four-sided aerodynamic assembly as it is exposed to highway speeds. Thus, any such structure can be referred to as a "bottom panel" or "bottom panel structure" in accordance with this description.

Having described the construction and general function of the aerodynamic assembly 100 according to illustrative embodiments, the application of an assembly to an existing trailer body (either OEM or retrofit) is now described in further detail.

The aerodynamic assembly is provided to an installer as plurality of component parts that are joined together and mounted on the trailer body according to a predetermined arrangement. Where the placement of trailer body door hinges 128 is known in advance, appropriate cutouts 810 can be provided in advance of installation (by the manufacturer) along the forward, door-facing edge of each side panel. The weather seal can be provided as a continuous, uncut length of material to be joined at a miter cut as described above, or the weather seal can come pre-constructed in the above-described L-shape, which is sized appropriately for mounting to each top and bottom panel. Because the overlapping central weather seals 1092 are relatively wide (1 inch or more), they can accommodate a small degree of variation in widths of doors and door frames that may occur for different makes and models of trailer bodies. Likewise, as noted above, the door-facing weather seal 1080 accommodates the potential for varied location of one or more lock rods on each door.

In preparing each door for installation, the installer employs a template (not shown) that can be constructed from paper, cardboard, or a more rigid material. The template is placed over the door and can include appropriate standoffs (spacer blocks and drill guides with tubular holes in the proper diameter) to clear the lock rod(s) and any handles, brackets, as well as the original hinges 128. Once the template is properly located on the door in a level position, it is secured in place (using clamps, temporary screws, tape, adhesive, human grip, etc.) while the installer drills all needed holes to mount the assembly's various hinges, brackets and bases to the door. As noted above, where the components are supplied to an installation in which the number and/or placement of original trailer body door hinges 128 is unknown, the side panel edges are unslotted. The installer then locates the vertical position or each hinge (128), and cuts appropriately sized slots (810) using a cutting bit or saber saw blade at the corresponding locations along the side panel's door-facing edge.

Once all of the holes are drilled and slots are cut, the panels are assembled together by applying fasteners to all living hinges in the appropriate locations. Panels can be predrilled to receive hinges and other components, such as stiffeners and mechanical door-to-panel hinges. The panels are then attached to each respective door using fasteners. The associated swing arm assembly is also attached to the door using fasteners that pass through its hinges and the door base of the gas spring. The swing arm assembly is then interconnected to the top and bottom panels by way of the tie rods (934). The tie rods (934) are adjusted to provide the appropriate angles of rearward projection to the top and bottom panels. Restraining cables (1040) are attached via footman's loops on the panels and doors, and adjusted to restrain the top and bottom panels with the desired valley angles between the top panel sections and the bottom panel sections, respectively. The top and bottom panels of the two assembly halves are also aligned so their center seals overlap and engage by adjusting the tie rods 934 and cables 1040 as appropriate. At some point during the installation procedure, weather seals 1080 and 1092 are attached, and slots are cut in the seals 1080 to accommodate one or more lock rods on each door. A sharp utility knife or punch can be used to cut rod slots in the seal.

During run-time operation of the trailer body with the attached aerodynamic assembly, it is contemplated that certain elements of the assembly will wear and require occasional replacement. For example, it may be desirable to replace some or all of the living hinges from time to time due to wear and tear, as well as due to damage caused by collisions with objects and vehicles. Notably, one advantage to the use of living hinges constructed from a pliable polymer material strip is that a collision between a panel of the aerodynamic assembly with an object or other vehicle will generally result, first, in tearing of one or more hinges before a panel crushes or shatters. Thus, the ability for the hinges to tear under modest impact forces tearing provides an energy-absorbing safety mechanism, which avoids more catastrophic failure of the assembly and/or damage to the colliding object or vehicle. Likewise, from time to time, gas springs may require replacement. This is a relatively straightforward undertaking, typically involving the removal of several fasteners and reattachment of a new gas spring with new or existing fasteners. In addition, weather seals may also occasionally require replacement. Again, this is a relatively straightforward operation in which the old weather seal is removed and a new weather seal is placed over the edge of the panel.

As described generally above, the panels are sized and arranged to allow for approved safety equipment. Appropriate reflectors, reflective tape, placards and instruction labels can be mounted or adhered to panels at appropriate locations. Additionally, panels can include LEDs and/or incandescent lighting as required (or desired) at various locations. Where lighting is included on a panel, appropriate electrical leads are typically provided from the trailer body to the panel (e.g. a flexible cable—not shown), which passes through the door frame or extends from the tail light pods. Alternatively, a door or panel-interior mounted battery and solar charger can provide power to lighting, with thin-film solar panels mounted, for example, along the top panels to provide charging power (not shown). It should be noted, however, that the arrangement as shown and described herein complies with current U.S. Transportation Regulations without the need of additional lighting on the panels themselves. In particular, the panels provide sufficient visibility for trailer top marker lights and tail lights, among others. With modifications to the panels' rearward length as described herein, the aerodynamic assembly can be readily adapted to other jurisdictions regulations, such as those of Canada.

Figure 16:
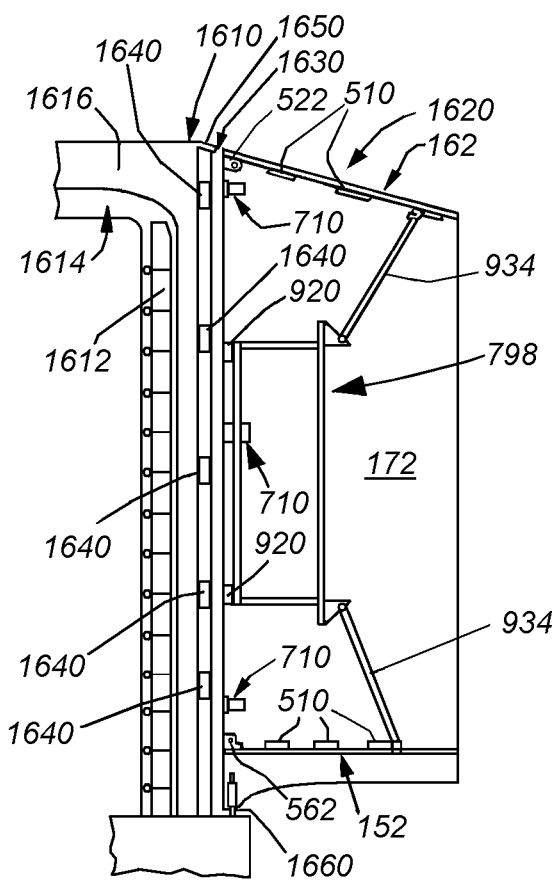
FIG. 16 is an exposed partial side view of a vehicle body rear having a non-swinging, roll-up door, and employing an aerodynamic assembly according to an alternate embodiment using a secondary, overlying door plane or framework, which is hingedly mounted to the vehicle rear.

It is contemplated that the aerodynamic assembly can be adapted to operate with a vehicle having non-dual-swing rear door according to an alternate embodiment. By way of example, FIG. 16 shows a vehicle rear 1610 having a roll-type door 1612 that rides along a track 1614 within the rear door frame 1616. This door spans the full width of the body, and is typically recessed forwardly within the frame 1616 as shown. A rear aerodynamic assembly is equally desirable in vehicles with non-dual-swinging door arrangements, and it is desirable to provide an assembly that allows for easy access to the door. In this embodiment, an aerodynamic assembly having a pair of aerodynamic assembly halves (the right-hand half 1620 being shown) is provided to the rear of the vehicle. The assembly in this exemplary embodiment is substantially similar to that described above (and like reference numbers are used for like components). Modifications can be made to the assembly in alternate embodiments to adapt the assembly to the particular application. In this embodiment the side panel hinges 710 and top/bottom panel hinges 550, 552, 560, 562 (552 and 562 being shown), all attached to a secondary swing-out door panel or open framework 1630. This door panel or framework 1630 provides the same base for mounting all components of the assembly 1620 and is provided in two halves, in the same manner of conventional dual swing-out doors. In particular, where the framework comprises a series of interconnected beams, it is contemplated that additional plates or cross braces are included to attach items such as the swing arm hinges 920. Alternatively, the secondary door panel 1630 can comprise a full panel constructed from metal, composite polymer or another acceptable material. For the purposes of this description the term "door" as used herein, in the context of mounting an aerodynamic assembly thereto, shall include a secondary door panel or framework (1630) that is attached to a portion of the vehicle rear overlying another form of door (roll-up, fabric, etc.), and allows for dual swing-out in the manner described for doors 122, 124 above. More generally, a door is any structure (framework, panel, partial-panel, etc.) to which an aerodynamic assembly half is attached. The secondary door panels or frameworks in the embodiment of FIG. 16 are, thus, arranged on the vehicle rear on separate hinges 1640 that are attached, for example to the rear frame 1616 of the body using screws or other fasteners. The number and placement of hinges 1640 is highly variable, and should be sufficient to support the weight of the secondary door panel or framework 1630 and the aerodynamic assembly half 1620 under aerodynamic loads. One or more seals or fairings 1650 can be provided between the door panel edge and the vehicle body. In the same manner as seals (1080, 1092, etc. described above) are provided to the assembly. The hinges 1640 are arranged to allow the right hand door or framework 1630 with folded aerodynamic assembly 1620 to swing outwardly approximately 270 degrees to fold back along the respective vehicle body side. Likewise, the left hand door or framework (not shown, but a mirror image of right hand door 1630) can be swung outwardly approximately 270 degrees to fold back along the respective vehicle body side. In this position a hook and chain can be used to secure each folded door unit to an eyebolt along the vehicle side (or using another conventional hold-down arrangement). This allows the vehicle to be parked side-by-side with other vehicles in a loading dock without interference therebetween. The roll-type (or other) door 1612 can then be opened conventionally, and the cargo handling can proceed in a normal fashion. After the cargo handling is complete and the trailer is removed from the loading dock, the right hand door or framework 1630 and left hand door or framework (not shown, but a mirror image of right hand door 1630) can be swung back through 270 degrees to close. The door or framework on each side is then secured using, for example, a latch mechanism 1660 that interacts with a receiving orifice in the frame. Any alternate latching mechanism can be employed. When the doors or frameworks are secured, the aerodynamic assembly is deployed.

While the above described embodiments and implementations of the aerodynamic assembly provide two halves of an overall four-sided aerodynamic panel structure (i.e. overall top formed from two panel halves, overall bottom formed from two panel/framework halves, right side panel and left side panel), with each aerodynamic assembly half residing on a respective door/framework, it is contemplated in alternate embodiments that both halves of the aerodynamic assembly as described herein can be mounted on a single door assembly or framework assembly that overlies a door, or more generally overlies the vehicle rear. Such a door assembly or framework assembly is adapted to swing out on hinges attached to the vehicle body so as to reveal the rear end of the vehicle. When swung out, such a door assembly with the two halves of the overall four-sided aerodynamic assembly can be positioned flush against the vehicle side, and allow for self-collapsing of the panels in each of the two halves (all against one side of the vehicle) in accordance with the above-described embodiments. In this manner, the aerodynamic assembly can be provided effectively to a roll-up rear door, a side curtain trailer with no rear door, or another vehicle where a single, full-sized door assembly or framework assembly is a convenient structure for mounting the aerodynamic assembly in accordance with the embodiments described herein. For the purposes of this description the term "door assembly" or "framework assembly" should be take to include one or two swing-out doors that carry all, or a respective half of the aerodynamic assembly. The "door assembly" can be one or two doors that provide primary access to the vehicle or it can one or more overlying surfaces that selectively cover a primary door, curtain, etc., or pair of doors. As such, the door or framework 1630 of FIG. 16 as depicted can be one of a pair of doors or frameworks, each carrying a respective half of the overall four-sided aerodynamic assembly, that each open onto opposing sides of the vehicle body, or a single door or framework carrying both halves of the aerodynamic assembly and opening onto a single side of the vehicle.

It should be clear that the particular arrangement of panels, and their folding geometry is illustrative of a variety of possible arrangements, such as those contemplated in the above-incorporated U.S. patent application Ser. No. 12/122,645, filed May 16, 2008, entitled REAR-MOUNTED AERODYNAMIC STRUCTURE FOR TRUCK CARGO BODIES, which employ an "origami" folding geometry on each half of the overall assembly in combination with a respective, interconnecting swingarm between at least a portion of the top and bottom panels of each assembly half. In alternate embodiments the panels can be arranged to fold in the desired, low-profile stacking arrangement contemplated herein by providing different, or additional divisions between panel sections. For example, top and bottom panels can be solid and the side panels can include additional hinged sections—for example a central hinged section and top and bottom side panel hinged sections that interconnect to the solid top and bottom sections. Likewise, the top, bottom and side panels can variously include a plurality of hinged, sections, all joined together to form a continuous, foldable structure. More generally, an aerodynamic assembly, having a top panel structure, side panel structure and bottom panel structure (which can be an open framework), constructed and arranged to allow the panels to fold into a stacked arrangement against the door contemplates all the various geometries contemplated herein. These assemblies are illustratively adapted for automatic deployment, either through spring bias or through other actuated mechanisms and can self-collapse when the carrying door or framework is folded against the vehicle side.

It should further be clear that the trailer body aerodynamic assembly, unlike the majority of those proposed recently, provides a practical, cost effective, user friendly and realistic solution to the need for rear aerodynamic fairings on a trailer body or similar conveyance. This solution will not interfere with normal trucking operations and lends itself to ready use by the driver without any significant inconvenience. Moreover, this assembly is readily retrofittable to virtually all existing trailers and fleets with a minimum of downtime or added capital cost.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, it is contemplated that the valley angles induced in the rear panels can be generated according to a variety of alternate techniques. In one exemplary implementation, the top and bottom panel hinges (on the door and/or side panels) can include stops that generate the desired valley angles. Likewise valley angles can be generated stops between the panel sections or along the swing arm assembly or gas spring assemblies. Moreover, in some embodiments, the top and bottom panels can be assembled to include a degree of inward-biased flexure within their structures when fully deployed so that they are biased to fold inwardly when retracted. This flexure can be arranged by providing asymmetry to the joints between panels. Additionally, while the gas spring is manually biased into a folded orientation, it is expressly contemplated that the gas spring can be substituted with a power-drive actuator (e.g. fluid actuator, electromagnetic solenoid, powered lead screw, powered cable pulls, and the like) that automatically deploys and retracts the assembly ether based upon a user's commands and/or upon the prevailing speed of the vehicle. Such actuation, which can be defined as a form of "automatic deployment" employs an actuation switch (for selective deployment and actuation), and or controller circuit located, for example, in the vehicle cab and operated by a driver or based upon the detected speed. The actuator can be located in the pace of the gas spring or at one or more other locations that interconnect with panels. More significantly, while the aerodynamic assembly is shown in conjunction with a wheeled trailer body, the principles herein (including a secondary door structure overlying the actual door) can be adapted to other types of truck-borne structures, such as fixed body (non-trailer) trucks, tandem trailers and intermodal containers. More generally, the aerodynamic assembly can be adapted to other vehicle body rear shapes with appropriate modification of mounting arrangements and fairings using adapters and intermediate mounting components between the body and the assembly in accordance with ordinary skill—such as, for example a car-carrier body, a livestock carrier body, tanker body, a dump body, a side curtain trailer body, a drop frame trailer body, and the like. Accordingly, this description is meant to be taken only by way of example, and not to otherwise limit the scope of this invention.

What is claimed is:

1. An aerodynamic structure for a cargo body comprising: a side panel hingedly mounted to the cargo body; an upper panel hingedly mounted to the cargo body that, together with the side panel, hinges between a folded position and a deployed position such that the aerodynamic structure defines an internal cavity when the aerodynamic structure is in a deployed position, the upper panel including a hinge line that defines a first foldable section and a second foldable section; and a gas spring assembly that biases the upper panel open at a predetermined spring rate when the aerodynamic structure is in the deployed position.

2. The aerodynamic structure of claim 1 wherein the predetermined spring rate is overcome when the aerodynamic structure is collapsed from the deployed position to a collapsed position.

3. The aerodynamic structure of claim 1 further comprising a swing arm assembly that is interconnected by a pivot to the damping assembly, the swing arm assembly assisting in moving the aerodynamic structure between the folded position and the deployed position and vice versa; wherein the opposing end of the gas spring assembly is mounted by a pivot to a base on the surface of the door.

4. The aerodynamic structure of claim 1 wherein the gas spring assembly is secured to the upper panel at one end and to the door at the other end.

5. The aerodynamic structure of claim 1 wherein the gas spring assembly is secured to the side panel.

6. The aerodynamic structure of claim 1 wherein the gas spring assembly is secured to the upper panel.

7. The aerodynamic structure of claim 1 further comprising a lower panel hingedly secured to the side panel.

8. The aerodynamic structure of claim 1 further comprising a lower panel hingedly secured to a framework of the cargo body.

9. The aerodynamic structure of claim 1 wherein the side panel is directly hingedly connected to the upper panel.

10. An aerodynamic structure for a cargo body comprising: a side panel hingedly mounted to the cargo body; an upper panel hingedly mounted to the cargo body such that, together with the side panel, hinges between a folded position and a deployed position such that the aerodynamic structure defines an internal cavity when the aerodynamic structure is in a deployed position, the upper panel including a hinge line that defines a first foldable section and a second foldable section; and a biasing member connected to the upper panel so that movement of the biasing member causes the upper panel to move between the deployed position and the folded position, the biasing member holds the upper panel open when the aerodynamic structure is in the deployed position, and the biasing of the upper panel is overcome when a force is applied to the side panel or to the upper panel.

11. The aerodynamic structure of claim 10 wherein the side panel is directly hingedly connected to the upper panel.

12. The aerodynamic structure of claim 11 wherein the biasing member consists of at least one of (a) a gas spring, (b) a cable assembly, (c) an assembly of folding members, or (d) a swing arm assembly hingedly mounted to a respective one of the doors.

13. The aerodynamic structure of claim 11 wherein the biasing member is connected to the upper panel at a location sufficiently distanced from a leading edge of the upper panel hingedly mounted on the door so as to enable a rigid deployed position across the entire upper panel.

14. The aerodynamic structure of claim 11 wherein a force exerted on the side panel causes the aerodynamic assembly to move toward the folded position.

15. The aerodynamic structure of claim 11 further comprising a lower panel that includes a diagonal hinge line thereon that defines a first foldable section and a second foldable section.

16. An aerodynamic structure for a cargo body comprising: a side panel hingedly mounted to the cargo body; an upper panel hingedly mounted to the cargo body such that, together with the side panel, hinges between a folded position and a deployed position such that the aerodynamic structure defines an internal cavity when the aerodynamic structure is in a deployed position, the upper panel including a hinge line that defines a first foldable section and a second foldable section; and a biasing member connected to the side panel so that movement of the biasing member causes the upper panel to move between the deployed position and the folded position, the biasing member holds the side panel open when the aerodynamic structure is in the deployed position, and the biasing of the side panel is overcome when a force is applied to the side panel or to the upper panel.

17. An aerodynamic structure for a cargo body comprising: a side panel hingedly mounted to the cargo body; an upper panel hingedly mounted to the side panel, the upper panel including a hinge line that defines a first upper foldable section and a second upper foldable section; a lower panel hingedly mounted to the side panel, the lower panel including a hinge line that defines a first lower foldable section and a second lower foldable section; and wherein the side panel overlies the upper panel and the lower panel when the aerodynamic structure is in a folded orientation; and wherein moving either the lower or side panel into their folded orientations also folds the upper panel into its folded orientation, and moving the upper panel into its deployed orientation also moves the lower and side panels into their deployed orientations.

18. The aerodynamic structure of claim 17 wherein the movement of the lower or side panel into their folded orientations is caused by a manual force applied by an operator standing on the ground, either directly or by rotating the door around to the outer side of the cargo body, causing the side panel to engage with the outer side of the cargo body.

19. The aerodynamic structure of claim 17 wherein the movement of the upper panel into its deployed orientation is caused by a biasing member.

\* \* \* \* \*